US008689121B2

(12) United States Patent
O'Riordan

(10) Patent No.: US 8,689,121 B2
(45) Date of Patent: Apr. 1, 2014

(54) SYSTEM AND METHOD FOR MANAGEMENT OF CONTROLS IN A GRAPHICAL USER INTERFACE

(75) Inventor: Donald J. O'Riordan, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 998 days.

(21) Appl. No.: 12/775,273

(22) Filed: May 6, 2010

(65) Prior Publication Data

US 2011/0276908 A1  Nov. 10, 2011

(51) Int. Cl.
*G06F 3/048* (2013.01)

(52) U.S. Cl.
USPC ........... 715/763; 715/205; 715/793; 715/764; 345/810; 717/120; 716/122

(58) Field of Classification Search
USPC .......................... 715/763, 765, 771, 803, 810
See application file for complete search history.

(56) References Cited

U.S. PATENT DOCUMENTS

| | | | | |
|---|---|---|---|---|
| 5,929,851 A * | 7/1999 | Donnelly | ....................... | 715/762 |
| 5,982,512 A * | 11/1999 | Kim | ............... | 358/498 |
| 6,025,849 A * | 2/2000 | Felser et al. | ................... | 345/441 |
| 6,121,965 A * | 9/2000 | Kenney et al. | ................ | 715/810 |
| 6,597,382 B1 * | 7/2003 | Charles et al. | ................ | 715/850 |
| 6,621,532 B1 * | 9/2003 | Mandt | ........................... | 348/841 |
| 6,944,829 B2 * | 9/2005 | Dando | .......................... | 715/798 |
| 7,188,317 B1 * | 3/2007 | Hazel | ............................. | 715/804 |
| 7,370,287 B2 * | 5/2008 | Sobeski et al. | ................ | 715/848 |
| 7,418,683 B1 * | 8/2008 | Sonnard et al. | ............... | 716/122 |
| 7,571,392 B2 * | 8/2009 | Cortesi | ........................ | 715/765 |
| 7,711,708 B2 * | 5/2010 | Bergstraesser et al. | ........ | 707/638 |
| 7,865,843 B2 * | 1/2011 | Srinivas et al. | ............... | 715/825 |
| 2002/0070977 A1 * | 6/2002 | Morcos et al. | ................ | 345/810 |
| 2003/0016246 A1 * | 1/2003 | Singh | ............................. | 345/763 |
| 2005/0268249 A1 * | 12/2005 | Colaco-Dias | ................. | 715/793 |
| 2006/0129983 A1 * | 6/2006 | Feng | .............................. | 717/120 |
| 2008/0077845 A1 * | 3/2008 | Cho et al. | ....................... | 715/205 |
| 2009/0007008 A1 * | 1/2009 | Wan et al. | ...................... | 715/805 |
| 2009/0172589 A1 * | 7/2009 | Brown et al. | .................. | 715/787 |
| 2010/0138028 A1 * | 6/2010 | Tasker et al. | .................. | 700/117 |

OTHER PUBLICATIONS

Qt 4.4.3: QAction Class Reference [QtGui module], Nokia 2008, pp. 1-13.

* cited by examiner

*Primary Examiner* — Boris Pesin
*Assistant Examiner* — Ayesha Huertas Torres
(74) *Attorney, Agent, or Firm* — Sawyer Law Group, P.C.

(57) ABSTRACT

Management of controls in a graphical user interface (GUI) of a computer system. In one aspect, a command is received to create and display a window in the GUI, the window including one or more controls, each control operative to perform a function of an application in response to selection. An associated scope for each control is determined and indicates an extent of shared use of the control within the GUI. It is determined if a different instance of the control already exists within the scope for the control. If so, resources of the different instance are referenced to be shared for use with the control and new resources are not created for the control. If no different instance exists within the scope, new resources for the control are created and stored. The window and the controls in the GUI are displayed.

34 Claims, 10 Drawing Sheets

SYSTEM AND METHOD FOR MANAGEMENT OF CONTROLS IN A GRAPHICAL USER INTERFACE

FIELD OF THE INVENTION

The present invention relates generally to graphical user interfaces for computer systems, and more specifically to management of controls in a graphical user interface.

BACKGROUND OF THE INVENTION

Graphical user interfaces (GUIs) have developed to become essential interfaces for many computer applications. For example, electronic design automation (EDA) is one application, including such uses as schematic design and layout design in which the designs for components and spatial layout of electronic components such as integrated circuits, circuit boards and other components are viewed, created and edited using displayed images and graphical controls. Designers use graphical display software tools to display, navigate, create and edit circuit schematics and layout designs as well as other types of designs.

User interfaces of modern EDA tools are now extremely complex, which is a reflection of the complexity of the modern integrated circuit (IC) design process itself. As the capability and complexities of IC manufacturing processes has increased over time, and the capability and complexity of the circuit design process and its tools has grown in a corresponding manner, the relative ease-of-use of many such tools has degraded significantly when they are compared with their earlier and simpler versions. By this it is meant that in today's EDA GUIs, access to important functionality and options is often hidden in deeply nested submenus and sub-dialogs, making them difficult for a user to find and interact with. This problem is not limited to the IC design area and EDA tool space, and the issues of managing user interface complexity have also arisen for other applications such as word processing, presentations, and spreadsheets have evolved substantially over many years into more capable and more complex tools, necessitating the authors of such tools to find techniques to simplify their otherwise overly complex interfaces.

One simplification solution of recent times has been to place more and more functionality (previously accessible only through sub-dialogs) into "state-bearing" graphical controls such as menu and toolbar elements, which are more easily accessed by a user. A state-bearing control can visually bear state from a set of mutually exclusive offered options, and is not just limited to a direct action as has traditionally been the case with menu and toolbar callbacks. One non-EDA example of a state bearing toolbar item is a text justification option in some applications such as word processors or presentation software. The user can choose one of offered options for a piece of selected text, and the state of that choice is then updated and visually presented in both that same submenu and in other areas of the GUI, such as in another menu or toolbar. The displayed state is updated to the current state of any selected text, e.g., whenever that piece of text is again selected, the associated state is displayed in those controls. The state is visually and clearly indicated by the GUI element in both the menu and the toolbar, e.g. via checkboxes, borders, or other indication. Another such example is a toolbar item providing a dropdown menu that allows the user to change a text highlight color for a piece of selected text. The toolbar item visually changes its state to illustrate the corresponding text attribute of any currently highlighted piece of text. Yet another example is a toolbar menu box for indicating font and/or font size for selected text, and allowing the user to view and/or select a font and font size. Such commonly used controls are readily accessible and visible, and do not consume a significant amount of screen real-estate, since they use a small icon to indicate the state, and only transiently use a larger screen area when the user interacts with them to change their state.

In contrast, current EDA software does not employ these features. For example, to change the default font height for Pin Labels, a user may have to first navigate to the correct options dialog (of which there may be several), and then find/choose the correct Tab within that dialog, in order to gain access to the corresponding control. It would be far easier on the EDA tool user to have a box in a toolbar and/or an analogous sub-menu which presented the most commonly used pin label font sizes to choose from. The visual simplicity and real estate economy of these approaches is clear and valuable. Such benefits would also be extremely valuable to users of even more complex applications, such as EDA applications.

EDA applications are extremely extensible and programmable by end users, CAD groups, and/or other users. This is because the IC design complexity is sufficiently high that no single EDA program can perform all desired functions, and so users often implement their own specific design needs in applications by extending the functionality of a vendor-supplied EDA application in an "aftermarket" fashion. It would therefore be desirable for users doing such application extensions to be able to provide GUI controls for their extended/customized functionality using simple space-efficient, state-bearing GUI controls in multiple places of a GUI, such as across multiple menus and/or toolbars.

However, there are issues related to the synchronization of states of such controls when used in multiple places of a GUI, and the efficient re-use of such controls across multiple design windows or "tabs" in a tabbed document interface. For example, some EDA GUIs in general allow for multiple windows to be opened simultaneously, and further, a tabbed interface in some EDA applications allows for any given such window to contain multiple tabs, where each such tab selects a different cell (or other view or displayed portion) in a hierarchical design, such as a layout design, schematic design, etc. There can therefore be quite a number of design cells or other design views opened at the same time. A list of menus and toolbars can be displayed above the active tab by the software for operating on the cell, or the data within the cell, among other functions. It is the EDA-specific toolbars and menus (at a minimum) that a user would wish to further customize, by creating additional or replacement state-bearing GUI controls including user-specific extended or additional functionality, such as checkbox items, radio buttons or other radio items, menu items, list boxes (or "comboboxes"), spinboxes, etc.

In typical applications, to allow self-synchronization of such multiple controls in different menus, toolbars, tabs, and applications, programmers must write complicated callback code that queries the system to determine the lists of all the open or active windows, tabs, applications, etc., and search these lists to find the same controls open in other places. Besides being a complex programming task, another problem with this approach is that the callback code becomes stale over time as additional controls are added to the applications.

In the case where the same general state-bearing control is made available in such a multiplicity of GUI locations, it is essential that these controls be maintained in a synchronized manner. For example, if a user should use a control in a Formatting toolbar to set the text foreground color to green, the same control in a Draw toolbar or other menu should also automatically have its state set to green. If an EDA tool user were to enable the grid using a grid on/off menu toggle, then a drafting toolbar or canvas-specific context menu which also contains a show/hide grid toggle button, should be also maintained in a synchronized state. Further complicating the situation is the need to be able to share resources differently on a plurality of levels, such as Globally, Per window, Per application, or Per tab of an application.

Thus there are a potentially large number of EDA GUI functionalities that would be better represented by state-bearing controls in today's complex EDA software. When this number of basic functionalities is multiplied by multiple design cells simultaneously open, multiple application windows open, multiple tabs open per application window, and multiple different locations (multiple toolbars, multiple menus) which can contain such controls, etc., the result is that there would be a very large number of such state-bearing (and resource consuming) controls created by the EDA framework. However, since the majority of these controls are not always visible by the user, it is further desirable to save memory and limit the number of controls created overall by sharing the resources for these controls as much as possible, and to synchronize the states of such controls. For a user, writing such highly optimized resource sharing and self-synchronizing code is extremely non-trivial, and very dependent on the architecture chosen by the original EDA software vendor. Hence any such written code is likely to be initially quite buggy, rapidly becoming stale/obsolete as the vendor tweaks the architecture (requiring rewrites), all of which ultimately leads to a situation whereby such controls will not be written or adopted en masse, thus defeating the purpose.

Accordingly, there is a need for a very flexible yet highly configurable software system which efficiently stores and automatically tracks and maintains multiple graphical controls for a GUI. There is also a need for a system which allows a user to easily define, manipulate and customize collections of such automatically-maintained GUI controls. The present inventions address such needs.

SUMMARY OF THE INVENTION

The inventions of the present application relate to management of controls in a graphical user interface (GUI) of a computer system. In one aspect of the invention, a command is received to create and display a window in the GUI on a display device, the window including one or more controls, each control operative to perform a function of an application in response to being selected by a user. For each of the one or more controls, an associated scope for the control is determined that indicates an extent of shared use of the control within the GUI. It is determined whether a different instance of the control already exists within the GUI and is within the scope for the control, the different instance of the control having stored resources. In response to a different instance of the control existing within the scope, the resources of the different instance of the control are referenced to be shared for use with the control and new resources are not created for the control. If no different instance of the control exists within the scope for the control, new resources for the control are created and stored. The window and the one or more controls in the GUI is caused to be displayed. A computer program product provides similar features as the described method.

In another aspect of the invention, a system for providing graphical controls in a GUI of a computer system includes one or more storage devices and a processor in communication with the storage devices. The processor receives a command to create and display a window in the GUI on a display device, the window including one or more controls, each control operative to perform a function of an application in response to being selected by a user. For each of the one or more controls, the processor determines an associated scope for the control that indicates an extent of shared use of the control within the GUI, and determines whether a different instance of the control already exists within the GUI and is within the scope for the control. If the different instance of the control exists within the scope for the control, the resources of the different instance are referenced to be shared for use with the control, and if no different instance of the control exists within the scope, new resources for the control are created and stored on the one or more storage devices. The processor causes a display of the one or more controls in the window that is displayed in the GUI on the display device.

The present inventions allow GUI controls within a complex application environment and graphical interface to be managed, customized, and extended. The states of scope-specific state-bearing GUI controls can be maintained in self-synchronization when used in different control collections such as toolbars and menus. The states of the controls are automatically managed when the GUI switches between applications, tabs and/or data. In addition, control collections can be created by users. The present inventions allow usability benefits of state-bearing controls to become more readily available in customized application interfaces.

DETAILED DESCRIPTION OF PREFERRED EMBODIMENTS

Figure 1:
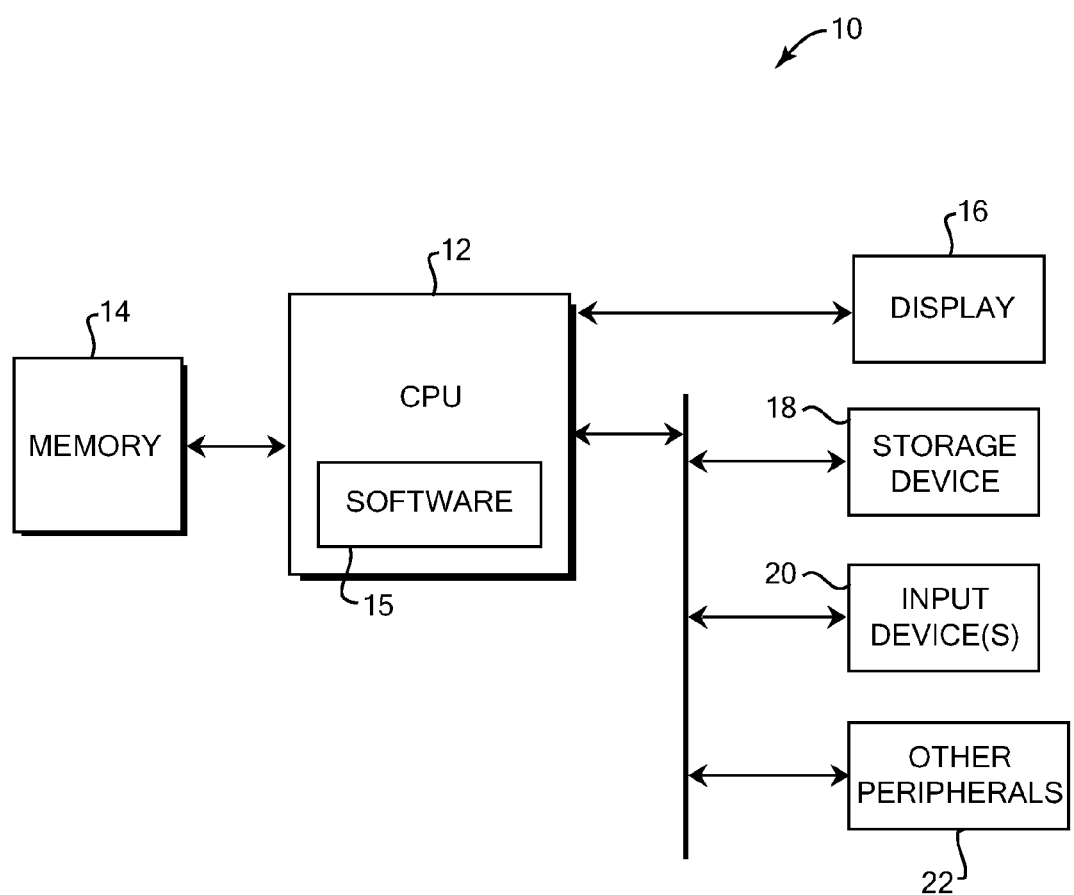
FIG. 1 is a block diagram illustrating a system suitable for use with the present inventions.

The present inventions relate generally to graphical user interfaces for computer systems and more particularly to management of controls in a graphical user interface. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present inventions are not intended to be limited to the embodiment shown but is to be accorded the widest scope consistent with the principles and features described herein.

Graphical controls are provided in GUIs to activate functions of application programs (or other programs) when selected or activated by a user. "State-bearing" graphical controls are provided in GUIs to visually bear one of a plurality of states available for each control. Unlike traditional direct-action choices, state-bearing choices offer a set of mutually exclusive options. One example of a state-bearing control is a graphical toolbar control allowing modification of a selected feature of the design. The user can select an object or feature of the design, and then select the control in the toolbar. Multiple presented options are displayed, and the user can select one of those options for the selected object. The state of that choice is then updated visually in the control and in other areas of the GUI that also display the same control (e.g., another instance of the same control), such as in a different menu or toolbar. The displayed state of the control is updated to the current setting of any selected object or feature. Another such example is a toolbar control providing a dropdown menu that allows the user to select a function, such as changing a characteristic of a selected object, such as its color. If any object is selected by the user, the toolbar control visually changes its state to illustrate the corresponding state of the selected object. By clicking on the control, the user is offered a simple menu from which to choose or change the color of the object.

Embodiments of the present invention provides state-bearing controls in top level menus and toolbars of software (such as CAD software) where they are readily accessible and instantly visible. Users do not have to navigate through confusing sub-dialogs and multiply nested option forms in order to be able to change the more commonly used properties of the objects with which they are dealing. Further, these state-bearing controls do not consume a significant amount of screen real-estate, since they use very few pixels (such as a small icon) to indicate the state, and only transiently use a larger number of pixels when the user interacts with them to change their state (such as displaying a menu or dropping down a list), reverting back to a small number of pixels or icon once selected. They are thus highly space efficient in addition to being readily accessible and visible.

EDA applications are extremely extensible and programmable by end users, CAD groups, and/or other users. This is because the IC design complexity is sufficiently high that no single EDA program can perform all desired functions, and so users often implement their own specific design needs by extending the functionality of a vendor-supplied EDA application. The present inventions allow users doing such application extensions the ability to provide GUI controls for their extended/customized functionality using simple space-efficient, state-bearing GUI controls in collections such as menus and toolbars.

As described for the present inventions, EDA software can benefit greatly from the use of state-bearing controls. A sampling of some EDA contextual examples in which such state-bearing controls are useful, such as in nested, difficult-to-find EDA tool options dialogs, include grid state (on or off, layout and schematic editors, waveform tools, etc.), grid spacing (dense or sparse, layout and schematic editors, waveform tools, etc.), wire snapping (on or off, schematic editors), auto-insertion of solder dots (on or off, in schematic editors), cross selection (on or off, layout, schematic editors, waveform viewers), cross hair cursor (on or off, layout, schematic editors, waveform viewers), gravity (on or off, in schematic editors), label font family, label font size, label justification (in schematic and layout editors), wire colors (schematic editors), or number of display levels (layout editors). In general it is desired that many more such customized controls and corresponding functionality could be quickly defined and easily added to an interface by users in an aftermarket fashion, e.g., customizing the application after obtaining the application from a vendor.

There are issues related to the synchronization of states of such state-bearing controls when used in multiple places of a GUI (such as across multiple toolbars), and the efficient reuse of such controls across multiple design windows or "tabs" in a tabbed document interface. For example, some GUIs in general allow for a multiple windows to be opened simultaneously, and further, a tabbed interface in some applications allows for any given such window to contain multiple tabs, where each such tab selects a different cell (or other view or displayed portion) in a hierarchical design (such as a layout design, schematic design, etc.). There can therefore be quite a number of design cells or other design views opened at the same time. A list of menus and toolbars can be displayed above the active tab by the software for operating on the cell, or the data within the cell, among other functions. Using embodiments of the present invention, a user can further customize the EDA-specific toolbars and menus by creating additional or replacement state-bearing GUI controls including user-specific extended or additional functionality, such as checkbox items, radio buttons or other radio items, menu items, list boxes (or "comboboxes"), spinboxes, etc.

The need to allow state-bearing controls to simultaneously appear in multiple toolbars is further predicated by recent additions of workspace configuration schemes. In order to allow a user to simplify his interface as a function of his current work task, the user is allowed to configure the interface so that he only sees those controls which are necessary to complete his current work objective, with other distracting controls being temporarily removed. Thus, for example, the user is able to choose a subset of toolbar/menu items that make sense for his current task. Furthermore, given a piece of functionality that is commonly used, its control can be made simultaneously available in multiple toolbars and/or menus. Commonality in sub-tasks is prevalent during the complex IC design process targeted by EDA software, hence the same general control for a given sub-task can be made simultaneously available in multiple places of a GUI.

When the same general state-bearing control is made available in such a multiplicity of locations (e.g., menus and toolbars), these controls can be maintained in a synchronized manner in embodiments of the present invention. For example, if an EDA tool user were to enable the displayed grid using a grid on/off menu toggle, then a drafting toolbar or canvas-specific context menu which also contains a show/hide grid toggle button, is also maintained in a synchronized state.

The present inventions also can provide the ability to share resources differently on a plurality of levels, such as globally, per-window, per-application, per-cellview, or per-tab of an application. For example, a single global control can be provided for a global resource such as background color (assuming all applications and designs are using the same background color). However, a given window having multiple tabs may use a particular foreground color for all tabs contained within that window, but the foreground color is different in other windows, so that a per window control is also provided. Further, a given window may contain a plurality of tabs, but these tabs may be assigned to different applications within the EDA framework (e.g., a schematic editor application, or a layout editor application). Application-specific controls can be shared across the multiple tabs of that same application within a given window such that all obey the same state (e.g. Boolean value), while a different application can have the opposite state in effect. For example, wire snapping may be enabled in the schematic editor which is shared across multiple tabs, while a layout editor that also runs multiple tabs within that same window of the schematic editor has wire snapping disabled. Additionally, tab-specific or cellview-specific controls can be made unique on a per-tab/cellview basis.

There can be a very large number of such state-bearing (and resource consuming) controls created by the EDA framework. However, since the majority of these controls are not always visible (e.g. in non-active tabs which are not displayed), the present inventions can save memory and limit the number of controls created overall by sharing the resources for controls as much as possible. The present inventions can also maintain in synchronization the states of controls which are simultaneously shown in a multiplicity of locations such as toolbars, menus etc., and performs this correctly on a global, per-window, per-application, or per-tab basis. A user can use embodiments of the present invention to create controls providing such highly optimized resource sharing and self-synchronizing functions without being dependent on the architecture chosen by the original EDA software vendor, thus avoiding or reducing the previous problem in which such code written by an end user is likely to be initially quite buggy, rapidly becoming stale/obsolete as the vendor tweaks the architecture (requiring rewrites), which in these previous implementations ultimately led to a situation whereby such controls were not written or adopted en masse, thus defeating the purpose.

The present inventions are also geared toward today's complex interfaces, so that the system is designed to allow the users of controls to not be required to be the original authors of these controls. The authors of the controls need to be computer literate, having good programming and CAD skills and detailed knowledge of the system with which they are interacting in order to provide the basic functionality which is controlled via the control. However, the final use and assembly of these controls into groups of related functionality, toolbars, etc. may be performed by persons with different skills, such as those who are experts in creating tool flows, actual end-users and/or designers, etc. Further, a particular state-bearing control may need to be re-useable across multiple integrated tools and flows, hence the system needs to support the ability for complex-control authors to share and publish their work for the consumption of others. An example can be a simple state-bearing control that can be re-used in a multitude of applications based on the same database and infrastructure. Detailed access to the infrastructure, database font metrics, constructs, etc. are accessible to the author of the control, but the end user assembling a toolbar or menu of such controls using the present inventions need not be concerned with such details.

Further, those assembling the toolbars and menus typically do not themselves have programming skills (and/or authorization/permission) to further assemble the controls into menus and toolbars. In the present inventions, an end-user can be offered the flexibility of graphically creating or modifying a toolbar, without requiring him to be an expert in the needed syntax. A GUI method is provided whereby any arbitrary user can access the control, and specify in which toolbars and/or menus it is to be included, all done simply via mouse point and click operations.

Further, the present inventions can allow control authors to limit the accessibility of the controls, e.g. only to those working in certain groups (who need access to the functionality) or those working on a particular project. For example, a particular checkbox control may need to be created that controls the state of a very particular object (such as whether one very specific design cell; e.g., a PLL has been checked in or out of a design management system). Only certain designers can be given access to such a control, while it can remain inaccessible to others who are working on different projects, or others who should not have write access to this object. Software of the present inventions run by specific users can find a certain/restricted set of controls which are available to be freely incorporated into menus and toolbars, with the restricted set definable by the authors of the controls or others. A programmable search mechanism for locating the appropriate control definitions at run time is provided.

The present inventions can also extend the programmable search mechanism for state-bearing controls to collections of controls, such as the toolbars and menus. Groups of related controls can be arranged into particular toolbars or menus, with these toolbars or menus made accessible only to certain groups of individuals, depending on various factors such as functionality of the controls, which project on which the users are working, which version of the software they are running, etc.

Hence, the present inventions can provide a very flexible yet highly configurable system which allows a user or CAD group to easily define state-bearing GUI controls via relatively simple templates, defining their scopes appropriately and have the underlying EDA software framework create, manage and synchronize their states appropriately, based on its knowledge of the number of open application windows, number of design tabs per window, number of different locations simultaneously showing the control, knowledge of which design tabs are currently active, knowledge of which sub-applications are currently running, knowledge of which design objects are currently selected, etc. For example, this allows control and control collection (menus, toolbars) authors to not have to track or be concerned with the current number of open windows, running applications, tabs, and other statuses of the GUI.

The present invention can provide such a system, allowing the usability benefits of state-bearing controls to become more readily available in customized application interfaces such as for EDA or other applications, with the accessibility of these controls and particular arrangements thereof to be made available in a controlled or managed manner.

FIG. 1 is a block diagram illustrating a system 10 suitable for use with the present inventions. System 10 can be any suitable computer system, server, or other electronic or hardware device. For example, the system 10 can be a mainframe computer, desktop computer, workstation, portable computer, or electronic device (set-top box, portable device, cell phone, personal digital assistant, media player, game device, etc.). System 10 includes a CPU 12, memory 14, display device 16, storage device 18, input device(s) 20, and other peripherals 22.

CPU 12 can be one or more microprocessors or other processors to execute program code and control basic operations of the system 10, including processing operations, manipulating data, issuing commands to other components of the system 10, etc. For example, an operating system can run on the system 10 and is implemented by the microprocessor 20 and other components of the system 10. CPU 12 can also implement graphical editing software application 15 of the present inventions, as described further below.

Memory 14 is typically provided in system 10 for access by the CPU 12, and can include one or more of a variety of types, such as random access memory (RAM), read-only memory (ROM), Electrical Erasable Read-only Memory (EEPROM), Flash memory, etc.

Display device 16 outputs displayed images to a user of the system 10. Display device 16 can be any of a variety of types of displays, including LCD, Plasma, CRT, etc. Some implementations of the display device 16 include a screen having a screen size, e.g., an area within which images are displayed.

Storage device 18 can store data that may be retrieved by the CPU (including program instructions and/or data for graphical application 15), and can be any of a variety of devices such as a hard disk, CD-ROM, DVD-ROM, Blu-Ray disc, magnetic tape, etc. For the present inventions, a file system or similar storage system can be used, where the files can be stored on one or more storage devices 18 (such as hard disks or other storage devices). For example, a distributed file system can store the template files used in some embodiments of the present invention.

Input devices 20 can include any of a variety of devices that allow users to input commands and data to the CPU, including a keyboard, mouse, trackball, stylus, touchscreen, microphone/voice recognition device, motion sensors, other electronic device (such as another computer system or portable electronic device), or other input device. Other peripherals 22 can include any other devices connected to and used by the system 10, such as any peripheral, card, or interface device that performs one or more functions and communicates with the system 10, such as network adapters that enable the system 10 to become coupled to other computer systems or devices through intervening private or public networks, scanners, printers, sensors, speakers, etc. In the example of FIG. 1, the display device 16 is connected to the CPU 12 by its own dedicated bus, while storage device 18, input devices 20, and other peripherals 22 are connected to a common bus that is also connected to the CPU. In other embodiments, the display device 16 and other devices can each have their own bus, or share one or more common buses. One or more of the buses or other links can be implemented using wires or wirelessly, according to any of well known standards and protocols.

Software 15 can be implemented by the CPU 12 to display one or more images and/or interface on the display device 16 and receive input from one or more of the input devices 20 to control the functions of the applications and interfaces. The software 15 can also be stored on storage device 18 and/or in memory 14. Software 15 can be one or more graphical applications and interfaces, and can include computer-aided design (CAD) functionality in some embodiments, or other functionality in other embodiments. In some embodiments, software 15 includes a "framework" of the present inventions which is one or more processes running on the system that detect user actions or events causing one or more methods or processes of the present inventions to be invoked or continued. The software 15 can also include an application environment and/or operating system running on the system 10, the environment allowing multiple different types of applications to be run and communicate data with each other. For example, an EDA environment can be provided which allows a circuit layout application and a schematic application to run, each application able to load relevant data from each other in some embodiments.

The interface provided by (or for, use with) the software 15 is a GUI that includes different controls, such as checkbox items, radio buttons, menu items, list boxes, spinboxes, etc. The GUI also can include collections of controls, such as drop down menus, toolbars, context-specific menus, etc. According to embodiments of the present invention, these GUI features can be readily created and edited for the system by users, and automatically synchronized, resource-shared, and access-restricted as described in greater detail below.

Figure 2:
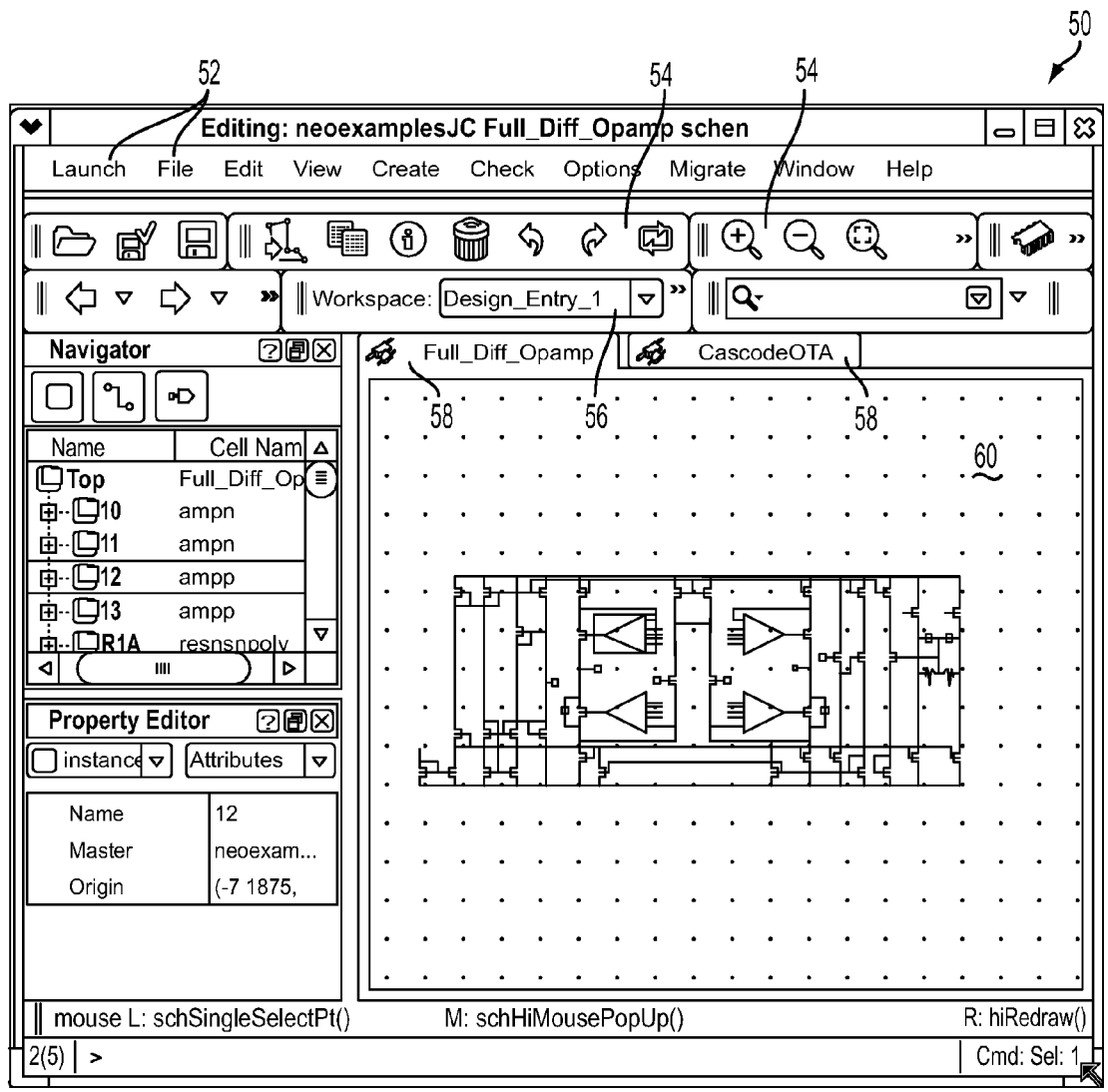
FIG. 2 is diagrammatic illustration showing an example of a window in a GUI suitable for use with the present inventions.

FIG. 2 is diagrammatic illustration showing an example of a window 50 in a GUI suitable for use with the present inventions. The GUI providing the window 50 can be used as an interface for EDA application programs, such as circuit schematics as shown, e.g. the window 50 is provided by a circuit schematics application. The schematics application can also provide additional windows if desired. Additional or alternative applications such as a layout design application can also be used, and provided in an EDA framework (environment) that allows multiple applications to run and share data if appropriate. For example, the schematic and layout applications can use the same design data to provide schematic and layout views, respectively. Other applications can be used in other embodiments, such as word processors, spreadsheets, drawing or photo editing programs, interne browsers, etc.

Window 50 is one of multiple windows that can be displayed in the GUI. Each window 50 can include various GUI features, such as drop down menus 52, toolbars 54, list boxes 56, etc. Drop down menus 52 cause a list of options to be displayed under the selected label heading. Toolbars 54 are collections of individual controls, which can be graphical buttons, checkboxes, list boxes (such as list box 56), etc. The controls of most interest for some embodiments of the present invention are controls allowing multiple states, such as an on/off state for a checkbox, or a particular font selection for a font list box. A list box 56 displays a list of choices from which the user can select one choice (or multiple choices in some embodiments).

Window 50 also includes multiple different cellviews of different cells or portions of the circuit design. In this implementation, a cellview is selected using the tabs 58. The example of FIG. 2 shows the tab and cellview "Full_Diff_Opamp" selected and displayed in the main viewing area 60, while the tab/cellview "CascodeOTA" is not selected. If the CascodeOTA tab were selected, the main view 60 is changed to display a different cellview corresponding to that tab, and the Full_Diff_Opamp tab 58 is displayed "behind" the selected tab. The window 50 can also provide different tabs, which are similar to cellview tabs 58 but can be used to select various screens of options and interface features of the application program, such as input fields, checkboxes, etc. Other interface features similar to tabs can be used in other embodiments to select different views or screens of options or portions of a design.

Figure 3:
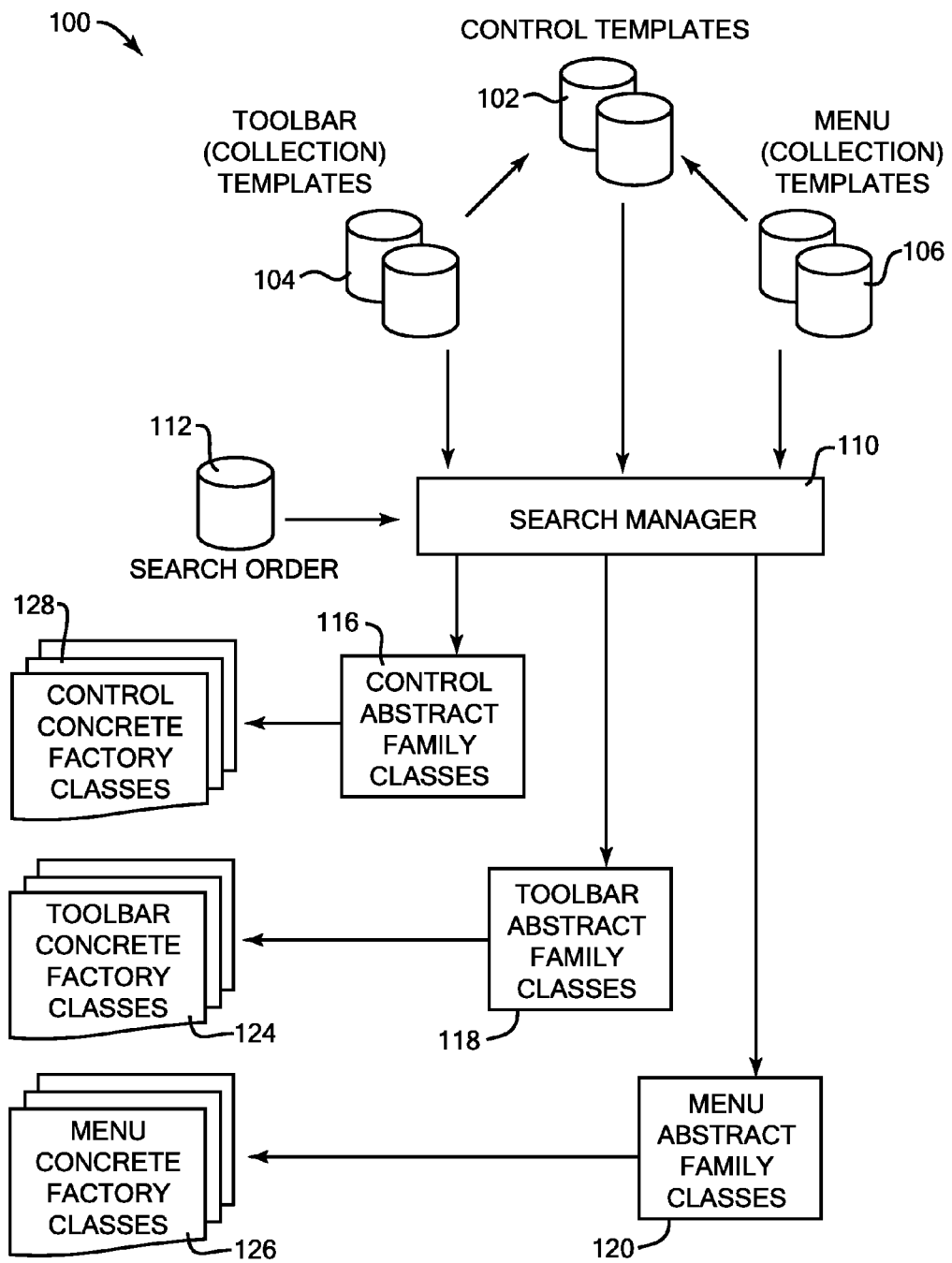
FIG. 3 is a block diagram illustrating an example of a system structure of the present invention for providing controls in a GUI.

FIG. 3 is a block diagram illustrating an example 100 of a system structure of the present invention for providing controls in a GUI. The system structure 100 can be implemented on one or more computer systems, such as system 10 of FIG. 1. The system structure can be implemented, for example, using a file system implemented on storage devices 18. The processing of data between the components of FIG. 3 can be performed using a software framework running on the system. Alternatively, a different software program or structure can be used. Herein, a "framework" is one or more controlling software processes of the present inventions running on the system, where the framework can be one or more programs and/or related code providing necessary described functionality.

For simplicity of discussion, the description and figures may assume a single application, but the inventions scale to multiple integrated applications and tools simply by addition of one extra level of indirection (e.g. the presence of an application-specific directory in file paths or file names to represent each application or tool), and will be understood by those practiced in the art.

Various users use the system which provides the features of the present inventions. Some users are individual persons, while other users may be part of a "CAD group", which is a particular group within a design organization. Other types of groups can be present in other applications and embodiments. The groups can be additionally organized into different types. For example, CAD groups can include a central CAD group, a site-specific CAD group, a project-specific CAD group, etc. Some users are "expert users" in the sense that they can develop detailed features of system software, such as the controls and control templates described herein. Expert users can be programmers, a CAD group that controls software for an organization (who, for example, can add customized code or extension code to existing vendor-supplied software), etc. "End-users" herein refer to users who typically do not know advanced programming techniques and are reliant on simpler interfaces to perform customization. These users can include individual persons. In some embodiments, "users" can include persons as well as other programs that interface with the system.

According to some embodiments of the present invention, control objects and collection objects (such as toolbar objects or menu objects) can be created as described herein in a resource-managed manner via appropriate usage of abstract and concrete factory classes. Such classes and their use is understood by those practiced in the art. For example, a factory object is a software object or portion of code for creating other objects, and typically has a method for every kind of object it can create which may accept parameters defining how the object is created. Abstract factory classes provide an abstract factory that provides an interface to create a number of products having a common theme (such as controls, or toolbars). Concrete factory classes are concrete versions of abstract factory classes with concrete products, and concrete objects can be created from the concrete factory classes. For example, client software can create a concrete implementation of an abstract factory class and then use a generic interface to create the concrete objects that are part of the concrete class's theme.

System structure 100 includes a number of templates 102, 104, and 106. These templates are created by users who are "control authors," which are expert users (such as programmers and/or central CAD groups). Templates are stored in one or more different locations on the file-system. For example, the templates can be stored in a distributed manner on a file system, e.g. in files of a designated syntax which are correspondingly parsed by the framework, or via executable code calling an appropriate template API.

The templates define particular object types used by the invention. For example, in some embodiments, the templates define object types including controls and control collections. In FIG. 3, control collection templates are provided as two types, menu templates 104 and toolbar templates 106. Other embodiments can provide other control collection types as appropriate.

Control templates 102 define the types of control objects, their callbacks, their scope, and other information related to a specified control. A control can be any of various types of user interface controls, such as standard GUI controls, which are used to activate one or more functions of an application program. Such standard controls can include graphical buttons, checkbox items, radio button items, menu items, list boxes (comboboxes), spinboxes, and other controls. The present inventions are also applicable to state-bearing controls that can each hold a state from a set of multiple available states.

For each such control, its control template allows a user to specify extra information. For example, this information can include any or all of the following:
 a symbolic name or reference,
 a textual name,
 a scope,
 an icon or other visual appearance,
 a state initialization function (associated function that initializes the control),
 a callback function,
 tool-tip text or help text.

Depending on the type of the control and particular embodiments, further information may also provided by the control template. For example, pre-designated choices or states can be stored in the template for a control having pre-filled states.

Each control template includes a specified scope for that control. The scope indicates an extent of shared use of the control within the GUI. This extent of use indicates which other, existing control instances that this control can share resources with, including synchronize its state(s) to, according to the methods of the present inventions. In the described embodiments, the extent of shared use within the GUI is based on a boundary as defined by a particular type of interface feature. For example, the scope can be defined at a global level (e.g., per environment), per window, per specified application, per unique tab of a specified application, or per cellview of a specified application or window. Thus, a global scope allows the control to share resources and be synchronized with other existing instances of the same control that exist anywhere within the environment, in any open or active application. A per-application scope allows the control to share resources and synchronize with existing instances of the same control within the specified application. A per-window scope allows sharing and synchronization with existing instances in a particular window (in a particular application), a per-tab scope allows sharing and synchronization with existing instances in a particular tab in a particular application, and a per-cellview scope allows sharing and synchronization with existing instances in a particular cellview within a window and/or application. The resources that can be shared include any or all resources needed to create, operate, and display a control object instance, such as memory allocation, class methods and definitions, icon and appearance data, set of available states which the control can assume, the current state of the control, and any other needed data or configuration; the set of used resources can be referred to as a "resource object" or single "resource" of a particular control.

Each control includes a callback function, which are instructions or references to the logic or code needed to perform the function(s) of the control in the underlying application program, such as turning on or off a grid in a layout editor view, changing a color of text, changing a font, etc.

Control collections are groups of controls and are associated with collection templates that specify multiple controls included within the specified group. The group can be presented to allow the user to select any control within the group, for example. Control collections can include standard GUI feature collections. For example, such standard collections can include toolbars, main menus, and context menus. Toolbars provide a list of iconic, textual, or symbolic representations of each control within the toolbar collection. A toolbar can reference by symbolic name any of the control templates described above that are included in its collection. A toolbar can in some cases be specified as multiple sets of individual toolbars such as General Operations, Drawing Operations, Format Operations, etc. Main menus can reference the control templates described above by symbolic name. These can include sets of multiple menus such as all the menus within a File menu, Edit menu, etc. A context menu (also called contextual, shortcut, and pop-up menu) is a menu in a graphical user interface (GUI) that appears upon user interaction, such as a right mouse click or middle click mouse operation. A context menu offers a limited set of choices that are available in the current state, or context, of the operating system or application. Usually the available choices are actions related to the selected object. Context menus can reference control templates by symbolic name for the included controls. Context menus can include multiple menus such as canvas menus, navigator menus, selected object menus, etc.

Collection templates 104 and 106 can be created by any user, including end users. For example, using one aspect of the present inventions, end users can customize control collections and their templates to extend a GUI's functionality without having to perform extensive programming or coding. This ability is described in greater detail below with respect to FIG. 6. Collection templates can be stored in a distributed manner on a file system, e.g., in files of any appropriately designated syntax which are correspondingly parsed by the software (e.g., XML, custom, etc.). Alternatively, the collection templates may be stored/retrieved by executable code calling an appropriate template API, e.g., templates may be generated dynamically during program initialization via author-invoked calls to a dedicated Template Registration API. The file system locations of the collection templates need not be the same as the locations of the control templates.

A search manager 110 (e.g., coded software process within software 15) is provided to process the templates 102, 104, and 106 during initialization and operation of the software framework. During a find phase of program initialization, the search manager 110 is invoked to search all of the template files to determine exactly which controls and control collections are available for use in the framework by reading the templates 102, 104, and 106. This allows for multiple definitions of the template files to exist distributed across a file system. In some embodiments, all of the templates 102, 104, and 106 can be read and processed. In other embodiments, only particular templates (and corresponding controls and collections) are available for use depending on the particular user, system, and/or other factors. The search method can be programmed by the user to determine exactly which set of templates are in effect for any given user of the program, and/or any given project, design site, etc. In some embodiments, a search order file 112 can be provided by a user and read by the search manager 110 to determine which particular templates are available, i.e. to determine the set of available templates. This is described in greater detail below.

Figure 4:
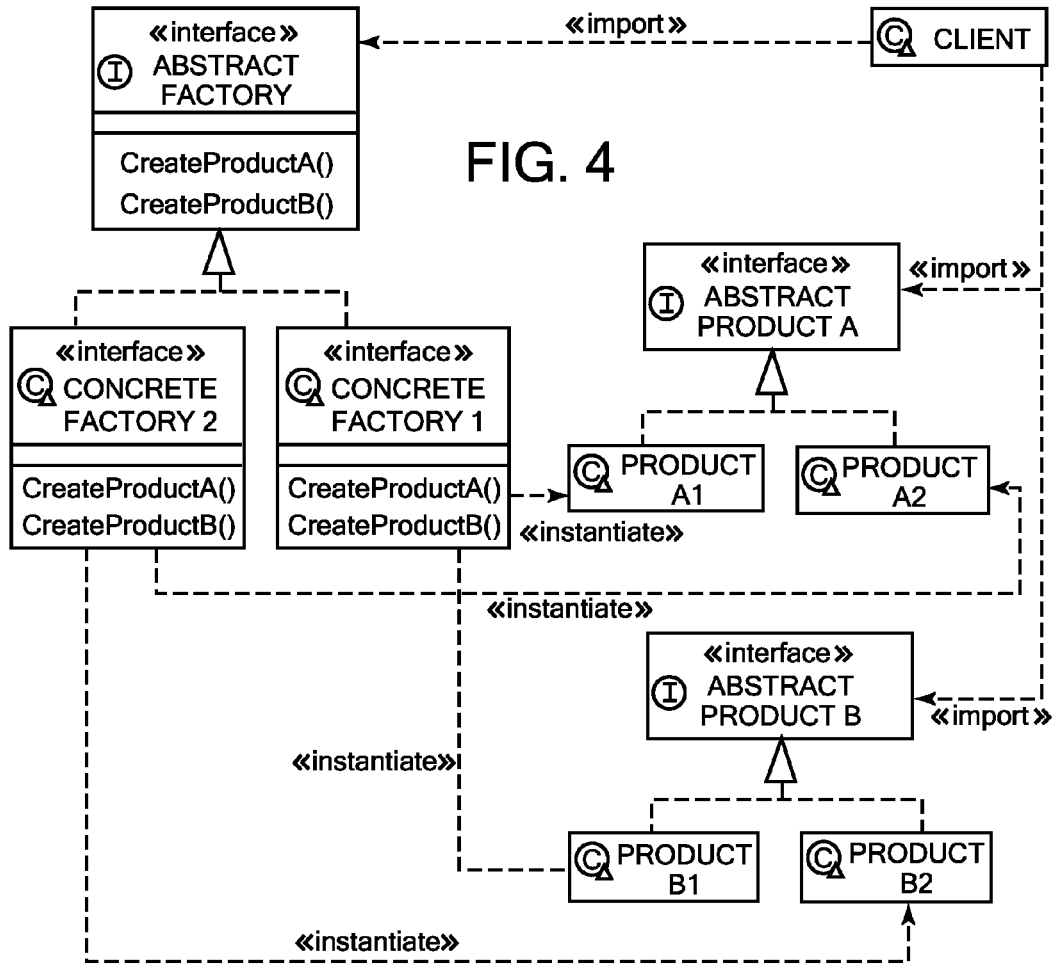
FIG. 4 illustrates an general example of an abstract factory pattern.

After processing the available control templates 102, the framework then instantiates control abstract factory classes 116 that correspond to the available control templates 102 found by the search manager 110. Likewise, after processing the available collection templates 104 and 106 (as determined by the search manager 110), the framework instantiates collection abstract factory classes that correspond to the available collection templates 104 and 106, including (in the described embodiment) toolbar abstract factory classes 118 and menu abstract factory classes 120, respectively. The framework maps the contents of the templates onto appropriate internal abstract factory classes (and/or data structures) representative of an abstract factory design pattern provided for each type of template. FIG. 4 shows a general diagram of one example of an abstract factory design pattern that is well-known.

Figure 5:
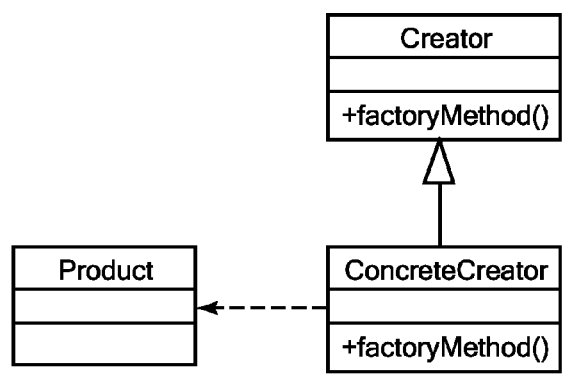
FIG. 5 illustrates a general example of a concrete factory method pattern.

After initialization, the system provides the usual application functions during normal operation. At various and appropriate times during program execution, particular user actions may occur that cause the system to determine that new collections of controls need to created. For example, the user may open a new window, open a new tab within a window, etc. At this time, concrete collection factory classes are instantiated, which provide methods that can generate the appropriate GUI collection objects, such as toolbars and menus. During the construction of the collections, the concrete collection factory classes call the needed control abstract factory classes for controls provided in the collections, in order to use the methods in those abstract classes to instantiate the control concrete factory classes. The concrete factory classes provide methods to create the actual unique control, toolbar and menu objects (i.e. the "widgets"), and share their state storage resources based on the scope information specified in the templates. A general diagram of an example of a (concrete) Factory Method Pattern is shown in FIG. 5.

The concrete factory classes are thus automatically created on an as-needed basis during system run time as determined by the framework, and call/invoke the appropriate (per-global, per-window, per-application, per-tab) control factory class methods to create the shared-resource controls to be displayed in the GUI. The factory classes creating the control objects ensure that resources are allocated and shared as specified by the scope specifications placed in the control templates by the control authors. For example, unique toolbars and menus that do not have any existing instances running by the system (within the allowed scope) are created as new objects whenever a new window is opened or toolbar created. New toolbars and menus that do have one or more existing instances are referenced to the existing instances without having to create new concrete class objects.

After the appropriate control objects and collection objects for the user-activated window, application, tab, etc. have been created or referenced using the concrete classes, the objects are then displayed and made operable as appropriate in the GUI.

During run-time and the operation of the system, users also can modify or create collections of controls via an appropriate graphical interface of embodiments of the present invention. This interface allows the user to select the controls he or she wishes to include in a collection.

User Customization of Control Collections

Figure 6:
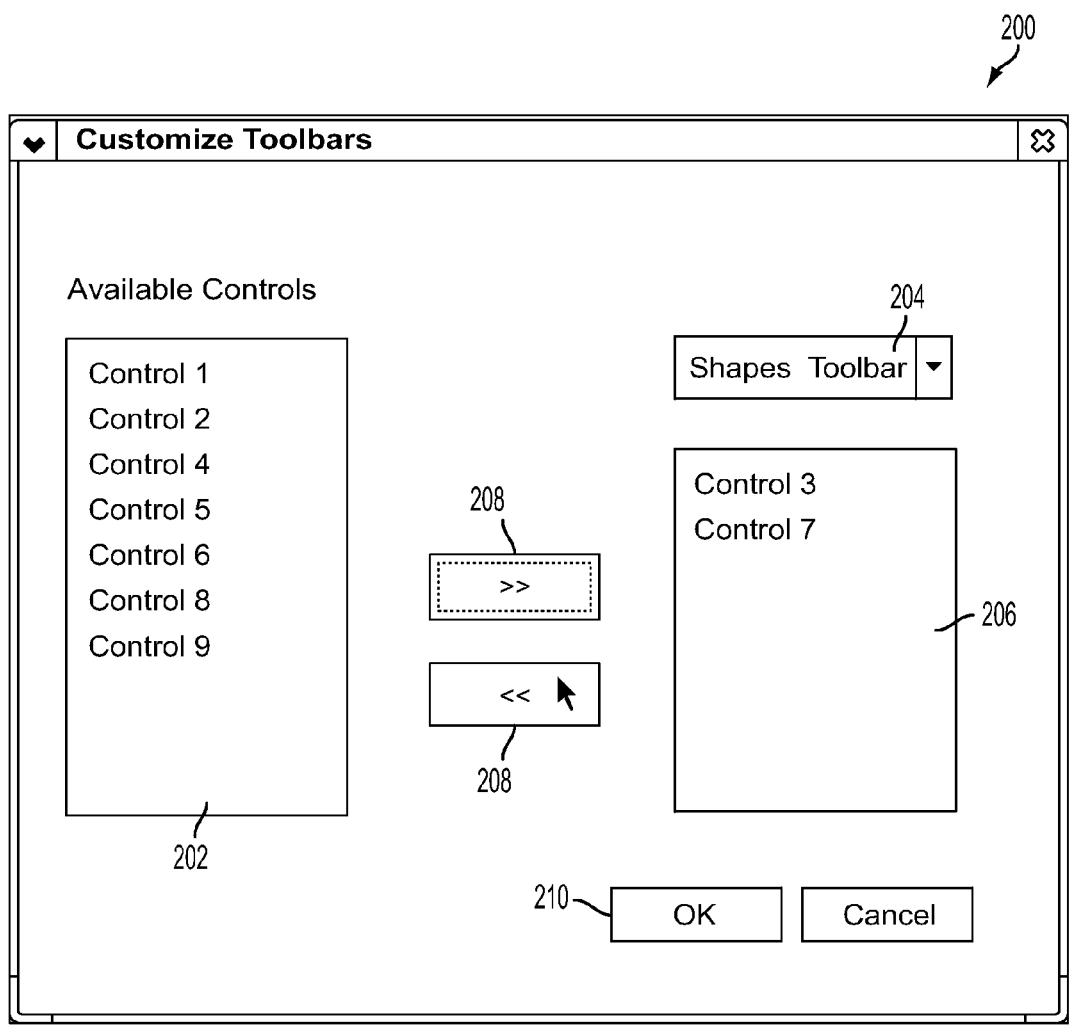
FIG. 6 is a diagrammatic illustration of one example of a GUI of the present invention allowing a user to customize collections of interface controls.

FIG. 6 is a diagrammatic illustration of one example of a GUI 200 of the present invention allowing a user to customize collections of interface controls. A dialog box can be used as interface 200 to present the user with selection and customization options; alternatively, other types of graphical interfaces can be used. A list 202 of available controls matches the symbolic names found in all (available) control templates found by the search manager 110, and is displayed on the left side of the dialog box 200. The user chooses a control collection to customize in the selection control 204, which in this embodiment is presented using a combobox. In this example, the combobox 204 has been manipulated by the user to select a "Shapes" toolbar for customization. Combobox 204 is populated with options including the list of collections (e.g., menus, toolbars) found by the search manager 110. The user can also create a new control collection by selecting a "New" option or similar function.

A list 206 below the combobox 204 lists the current set of controls included in the collection selected by selection control 204 (Control 3 and Control 7 in this example). The user can select the buttons 208 to remove and/or add selected controls from/to the chosen collection displayed in list 206. The user can then select another collection using the combobox 204 and repeat the operation for that collection. In response to the user finishing with this interface (e.g., by selecting the OK button 210), a "save" operation is generally followed such that the interface 200 creates new collection template files based on the user-selected controls included in the collections, or updates/modifies existing templates according to the user selections. These creations and updates are saved persistently on data storage device(s) such that the templates can be re-used during subsequent invocations of the application program or environment.

The interface 200 thus allows an end-user to customize groups of state-bearing controls in a graphical interface without the need for using detailed programming or coding techniques or knowledge of such techniques. In some embodiments, only those allowed controls and collections located via the search manager 110 can be configured using interface 200. This allows particular templates to be restricted for certain users, systems, or based on other criteria, as described in greater detail below.

Various enhancements can be also presented in interface 200 without departing from the spirit of the invention. For example, enhancements such as filters or hierarchical arrangements of the controls can be displayed.

Resource Sharing

The system framework can maintain a number of tables in available data storage devices (memory, disk, etc.) to store resources (data) relevant to the created controls and collections of the present inventions. For example, the tables can include a global table for storing global variables and their states; a window table for storing a list of currently opened windows and a state specific to each of those windows (in some embodiments, the windows list can store which application the window is running within, if an application can run multiple windows); an application table for storing a list of currently running applications in each window (if multiple applications can run within a window) and state specific to each of those applications; and tab tables for storing a list of currently open tabs maintained by each application running in each window.

As any window is created by the system during system operation, its creation process requires control collections of that window (such as toolbars and menus) to be created. The associated templates are checked as to whether the window includes any control collections that include controls which were specified to have a global scope. If so, a single, unique shared resource (e.g. a set of needed resources) is allocated and created for that control by the corresponding concrete factory class. That resource is stored within the global table. Numerous techniques familiar to those practiced in the art can be employed to create and manage such shared resources. For example, some embodiments can employ the QAction class from the Trolltech Qt library (from Nokia™ Corp.), which creates the widget (object, appearance, and resources) for the global control, and manages its state as a shared resource. If a second window (or third window, etc.) is later created containing any control collection having that same globally-scoped control (e.g. a different instance of the same type of control), the framework does not need to create a new set of resources (e.g., instantiate a new or further QAction class); it merely references the existing set of resources (e.g., QAction class) stored in the global table. The process is repeated for all globally scoped controls referenced by the control collection templates, which were found by the search manager 110.

Similarly, if a newly-created window includes any collections having controls which are specified with a per-window scope (such as controls that control the background color of all applications running within the window), unique controls are first allocated and controlled on a per-window basis by the appropriate method of the corresponding concrete factory class. Again as an example, the QAction class from the Trolltech Qt library can be used at the core level in some embodiments, such that a single reference-counted shared resource is allocated. This resource is stored within the window table for that window. If multiple control collections are created within that window having one or more instances of that same per-window scoped control, no additional resources are allocated to represent that per-window scoped control, e.g. the concrete factory classes derived from the templates are not invoked. Instead, references to the already created resources (stored in the window table) are used. The process is repeated for all per-window scoped controls referenced by the collection templates, which were found by the search manager 110.

A similar process is performed during application creation (invocation), as well as construction of tabs and cellviews within the application. The per-application and per-tab (and per-cellview, if maintained as a separate list) tables are respectively pre-populated with resource objects (such as QAction objects) representing those controls specified with per-application and per-tab scopes respectively in their template definitions, such that there is one unique shared resource object created by the corresponding concrete factory class for each application and tab-specific control, regardless of the number of application or tabs which have been invoked or opened by the user. For each such additional application or tab opened by the user, a reference to the existing shared reference-counted resource (maintained in the application table and tab tables, respectively) is created (if instances of the controls already exist). The process is respectively repeated for all per-application/per-tab scoped controls referenced by the collection templates, which were found by the search manager 110.

During regular system operation, the underlying library (e.g., Qt library) maintains the visual states of the shared-resource (i.e., linked) controls across the multiple tabs and windows in which they are visible, e.g. to update the visual appearance of the controls with any changed states of these linked controls on a display. For example, if a user changes (checks) a per-window grid control checkbox button in a first tab within that window, and there are three additional references to that control (e.g., one in a menu, one in a first toolbar, and one in a second toolbar), all three references to that resource within that window are requested to "repaint" (display) themselves in a checked manner. Alternative resource sharing techniques, such as reference counting, using other libraries than the Qt library, etc., can also be used in like manner in other embodiments.

Thus, the resource sharing of the present inventions allows multiple instances of the same control in different areas of a tab, window, application, or environment to use the same resources, thereby saving memory space for allocation and the number of control objects that need to be created. This can be a significant savings in resources if many controls of the same type are used, as in common in complex EDA applications.

Event Callback

The present inventions can provide API functions which allow user customization code to obtain handles to the actual controls which are created by the concrete factory classes. The handles allow the states of those controls to be updated programmatically by the user customization code during program execution. These API functions can return pointers to the shared resources (e.g. QAction resources) stored in the global, per-window, per-application, and per-tab tables mentioned above.

In response to certain user events during the operation of the program, such as selection of a control to change its state, the various callback functions (as defined in the templates as described above) are called and executed by the system (e.g., the framework). The unique handles to the control objects are made available to these callback functions. These handles are the same as the references stored in the global, per-window, per-application, and per-tab scope tables described above. The callback function uses the handle to find the current state of a selected control (for example), change the current state of the selected control to the state selected by the user, and change the visual appearance of the selected control. If, for example, the user selects an object that will cause the control to change state (for example, selecting a design object that has a different color than a color displayed by a color control), then the selection callback function uses the handles to change the current state of the control in the template.

In response to certain other events during the operation of the program, such as the user selecting a different tab or application or view, the appropriate collection objects are automatically switched in and out (mapped and unmapped to the display screen as appropriate, i.e. displayed or not displayed), such that their visibility is a function of the currently active tab (and any other active functions), as determined by the framework. For example, the framework thus can determine, after the user has switched tabs, that a particular control collection no longer needs to be displayed; hence it unmaps the collection widget, which implicitly unmaps all the children controls for that collection such that they are no longer visible on the screen.

Distributed Storage Mechanism

Figure 7:
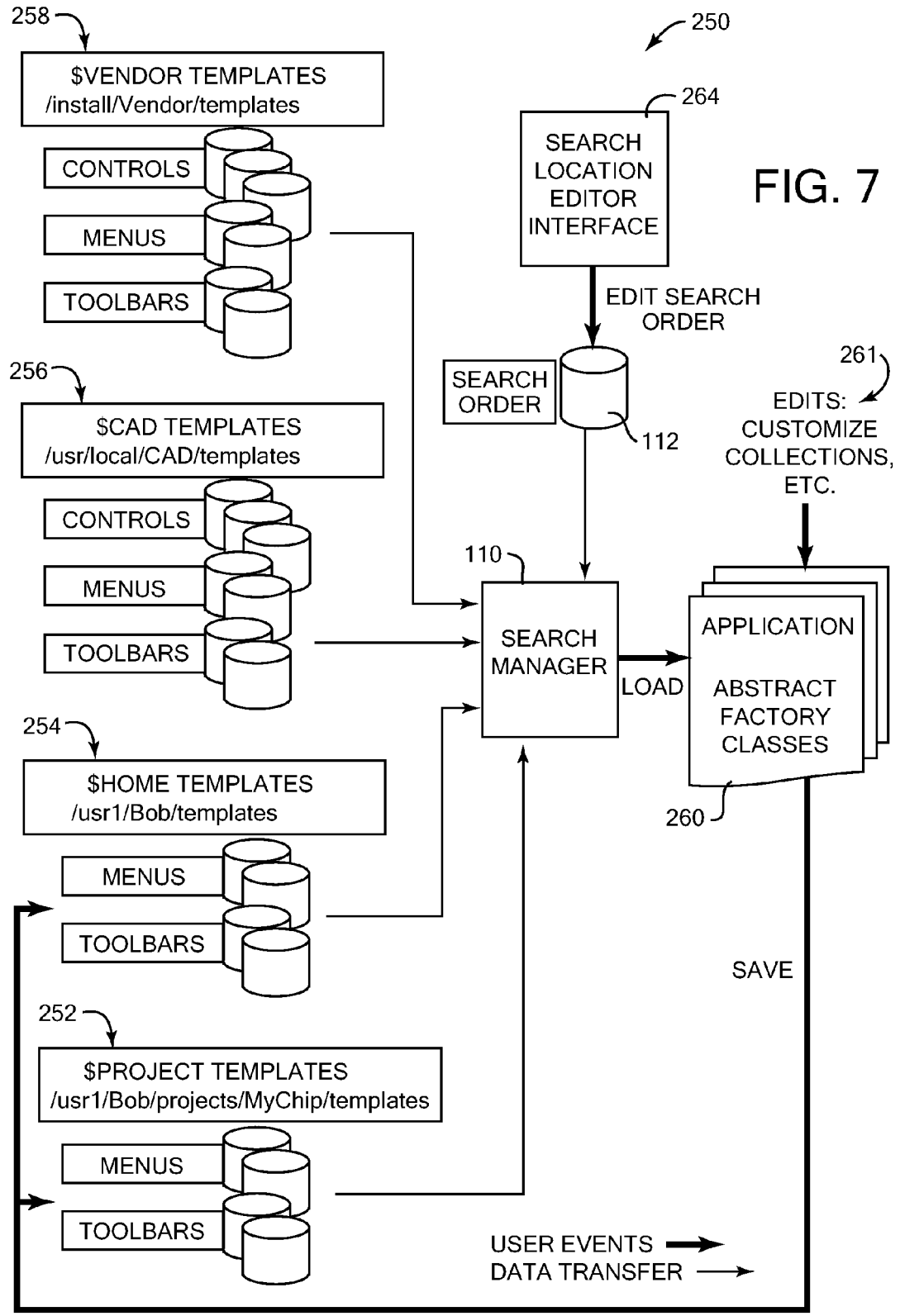
FIG. 7 is a block diagram illustrating an example of a distributed template architecture suitable for use with the present inventions.

FIG. 7 is a block diagram illustrating an example of a distributed template architecture 250 suitable for use with the present inventions. The architecture 250 provides a logical way to store multiple template definitions in a file system.

Control templates and collection templates (such as menu and toolbar templates) are saved persistently on a storage device(s) such that the templates can be re-used during subsequent uses or invocations of the system software. The example implementation in the described embodiment provides multiple template databases stored as named disk files on a file system, in appropriate directories designated to the purpose of storing control templates and control collection templates. Examples of such database disk filenames may include "Controls.template," "Menus.template," "Toolbars.template," etc.

Template files can be stored in appropriately named directories. The embodiment 250 of FIG. 7 shows one example of four directories, "$PROJECT" 252, "$HOME" 254, "$CAD" 256, and "$VENDOR" 258. These are symbolic references (environment variables) to different locations in the file system. The $HOME directory 254 can be a home directory for a particular user used to store templates for that user. The $PROJECT 252 directory can be used to store templates used for a particular project for that particular user. The $CAD directory 256 can store templates for a particular customization/installation from the user's CAD group. The $VENDOR directory 258 can store templates for an installation for a particular vendor or other third-party that may have access to the interface.

Using the example directories, a list of directory paths for a set of templates might look like the following:
  $HOME/templates/Menus.template
  $HOME/templates/Toolbars.template
  $PROJECT/templates/Menus.template
  $PROJECT/templates/Toolbars.template
  *$CAD/templates/Controls.template*
  $CAD/templates/Menus.template
  $CAD/templates/Toolbars.template
  *$VENDOR/templates/Controls.template*
  $VENDOR/templates/Menus.template
  $VENDOR/templates/Toolbars.template This list includes two control templates, shown in italics, and eight collection templates. This indicates that, for the entire set of templates, control templates only exist in the CAD and VENDOR directories, while collection templates exist in all four directories. The above list is an example only, and that other encoding methods, logical and/or physical, which work on other file systems (the above example assumes a UNIX file system) are also appropriate without departing from the spirit of the invention.

Template files created by expert users and central CAD groups are stored in the directories, as well as template files created by a user. For example, an end-user can perform edits 261, such as creating or customize control collections using a customization interface (such as the interface 200 shown in FIG. 6) that is included in an application 260, which can be any of the applications using the controls such as a layout application or schematic application. Alternatively, a separate customization application can be used to create collections. The customization interface can save created or modified collection templates to the files in the directories, as shown graphically by the "save" user event 262 in FIG. 7 that saves collection templates from application 260 to the $HOME directory 254 and/or $PROJECT directory 252. Template files stored in the directories 252, 254, 256, and 258 are provided to the search manager 110 when the search manager 110 examines templates for providing controls and collections in initialized or newly-opened windows.

Search Order and Precedence for Templates

The search manager 110 searches for and finds appropriate template files during initialization of the system, as described above with respect to FIG. 3. In this described example, the search manager 110 is set up to search for template files of the form or pattern:

. . . /templates/{Controls,Menu,Toolbar}.template

Again, the names and examples as described herein are with respect to one embodiment only, and that other similar conventions may be equally followed without departing from the spirit of the invention. The example illustrates that the file system is searched looking for patterns such as the above pattern, in order for the system to realize the set of available templates from which the effective factory classes can be constructed.

The template files in the example above include multiple (here, four) definitions of toolbars, specifically:
  $HOME/templates/Toolbars.template
  $PROJECT/templates/Toolbars.template
  $CAD/templates/Toolbars.template
  $VENDOR/templates/Toolbars.template Further, there are two sets of Control template files in this example, specifically:
  $CAD/templates/Controls.template
  $VENDOR/templates/Controls.template For the system to determine which of these identically named definitions to apply when toolbar factory classes are created, a search lookup order can be provided or programmed into the system. In some embodiments, as shown in FIG. 7, this is specified by placing some information in a special file read by the search manager 110, which is the search order file 112 (also shown in FIG. 3). The search order file 112 may contain a list of the directories to be searched in a specified order. The first desired template to be found in the list is used, while identically-named definitions in lower-listed directories are ignored. For example, a search order such as $HOME, $PROJECT, $CAD, $VENDOR can be provided in the search order file, or any desired order, such as $PROJECT, $HOME, $CAD, $VENDOR. In some embodiments, a search location editor interface 264 can be used by a user to specify a desired search order that is stored in the search order file 112.

In these examples, a simple sample syntax is illustrated which allows a search order to be specified in a top to bottom order. By following this search order, the search manager can then determine which of the two control template files to load, and which of the four toolbar template files (in this example) to load, from which to construct the control and toolbar concrete factory classes. In other embodiments, other mechanisms may be used to specify a search order without departing from the spirit of the invention, e.g. API-based, differently named files, different syntaxes, etc.

Another example of a search order may be a search order file created by a CAD group containing only the two toolbar templates in the following order: $PROJECT, $CAD. In this example, only those toolbar template configurations created by a CAD group ($CAD), for certain specific projects ($PROJECT), become accessible to the end user of the GUI and software. Any collection templates stored by the user under his $HOME directory would not be accessible, and neither would those examples supplied by the vendor ($VENDOR).

The system can therefore be configured via this kind of mechanism to restrict access to particular template definitions based on a particular user or user's design site, whether that be the home site (using the HOME directory), a particular CAD group site (using the CAD directory), vendor site (using the VENDOR directory), etc., and to obtain template definitions as deemed appropriate for a given user's design site. This allows multiple control collection definitions to be created and co-managed, in addition to multiple definitions of the control templates themselves. For example, the same control template definitions can be placed in multiple directories, based on which site is to have access to those templates.

Staying with the current example, the following window configuration databases are assumed to be in the file system:
  $HOME/templates/Menus.template
  $HOME/templates/Toolbars.template
  $PROJECT/templates/Menus.template
  $PROJECT/templates/Toolbars.template
  $CAD/templates/Controls.template
  $CAD/templates/Menus.template
  $CAD/templates/Toolbars.template
  $VENDOR/templates/Controls.template
  $VENDOR/templates/Menus.template
  $VENDOR/templates/Toolbars.template
Furthermore, a search order file is programmed with the following directories and order:
  $PROJECT
  $HOME
  $CAD In this example, when software attempts to load the Control templates, the system will first attempt to find such templates in the $PROJECT directory. Failing that, it will attempt to find the control templates from the users $HOME directory, and failing that, it will attempt to find the control templates from the $CAD directory. Given the example above it will successfully find the control templates in the CAD supplied examples in "$CAD/templates/Controls.template."

Likewise, when searching for the control collection templates, the programmed search order will be followed. Assuming the same scenario of the first-found template wins, the collection templates found in the users $PROJECT/templates directory will be used.

Operation Methods

Figure 8:
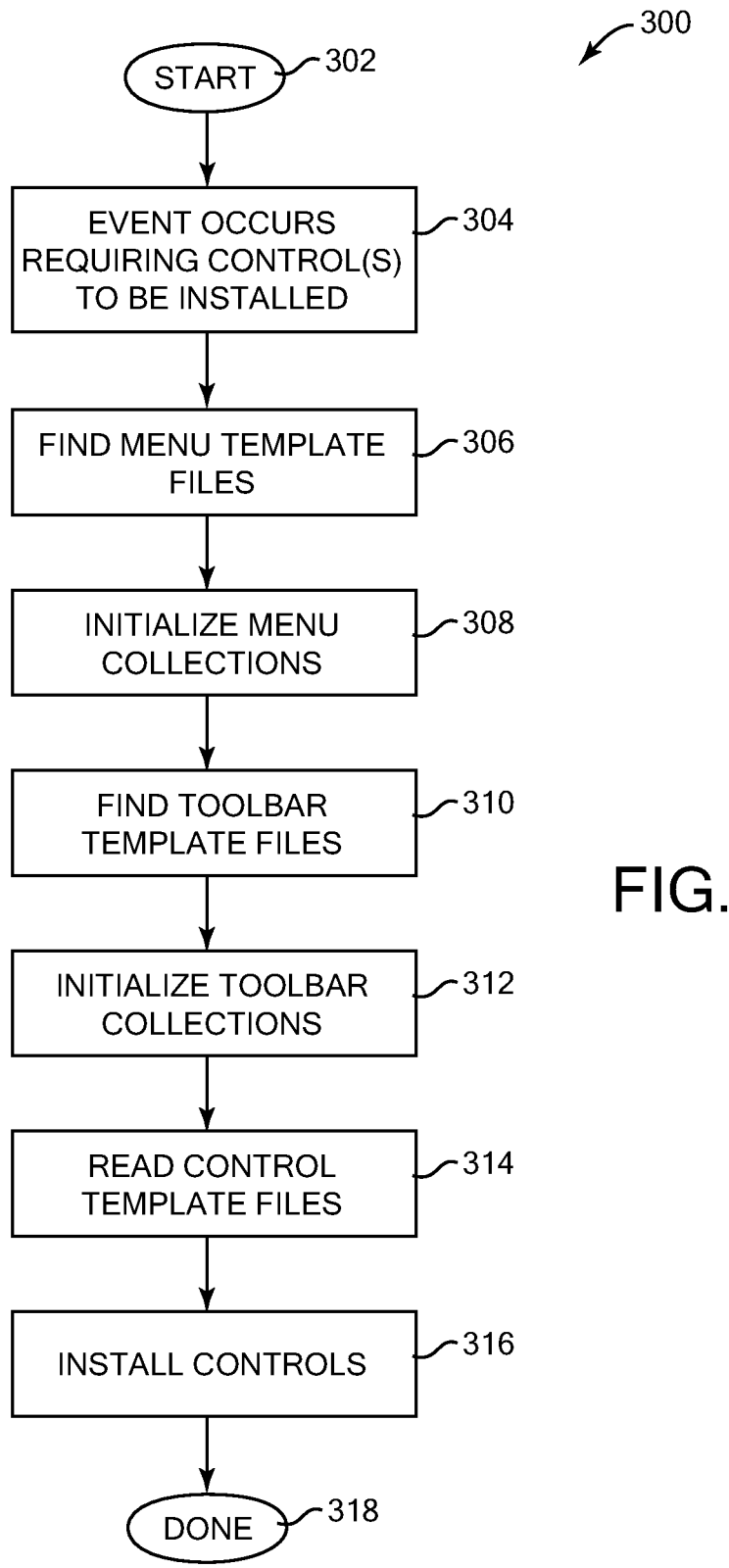
FIG. 8 is a flow diagram illustrating a method of the present inventions for providing GUI controls in control collections for display in a GUI during system operation.

FIG. 8 is a flow diagram illustrating a method 300 of the present invention for providing GUI controls in control collections for display in a GUI during system operation. Method 300 can be implemented on one or more computer systems, such as on system 10 which runs an environment, framework, and/or graphical application program(s) in software 15, or implemented on a similar system different than the system used to run the applications. The method 300 assumes that the system has already been initialized and is operating, i.e., the set of available control templates and collection templates has been searched and determined and appropriate classes initialized as described above.

The method begins at 302, and in step 304 an event occurs requiring controls to be installed in the GUI. During program operation, certain events require sets of menus and toolbars (and other components) that provide access to state-bearing controls need to be created, and populated with the controls. The kinds of events that require such operations can include a variety of actions or occurrences, such as, for example, a user action such as the user opening a first window, the user opening a second window, the user opening a first application (such as an EDA application such as a schematic editor, layout editor, symbol editor, etc.) in a new window or existing window, the user opening a second application in a new or existing window, the user creating a new tab within a new or existing window, and the user switching between tabs or cellviews in a new or existing window. In some embodiments, the events can be initiated by one or more other, different programs performing any of these actions (these other programs also being referred to as a "user" herein). The events may also include other events or occurrences not initiated by a current user action, such as a window opening based on a timed schedule, etc.

Any of the above events may require state-bearing controls to be created and installed in the GUI. In response to the event of step 304, the remaining flow of method 300 will be executed by the code in the appropriate abstract and concrete factory classes, examples of which are shown in FIG. 3. In one example, the event requires a menu template, and then the menu factory abstract and concrete classes, and the control factory abstract and concrete classes for all controls in the menu, execute their code.

In response to an event of step 304 occurring, the method 300 continues to step 306 to find and read, for example, the needed menu template files from menu templates 106, and initializes the menu collections in step 308, assuming there are one or more menu collections to be installed. Appropriate menu collections are created as "parents" for the controls in the menu, per the menu template definitions, i.e. the collections are containers or groups of the child controls in those collections. Similarly, assuming there are one or more toolbar collections to be installed, in step 310 the method 300 finds and reads the needed toolbar template files from toolbar templates 104 and initializes the toolbar collections in step 312 as parents for the toolbar controls in those toolbars. Other kinds of collections can be similarly found and initialized in other embodiments.

The collection templates 104 and 106 reference one or more of the controls named in the control templates 102, as shown in FIG. 1. In step 314, method 300 reads the control template files 102 for those controls included in the found menu and toolbar templates. The found collection templates and control templates can include placeholders for the controls, e.g., blank slots which are not filled in as yet and are filled in with particular controls or information after it they are created or known. In step 316, the controls in the read control templates are installed in the appropriate control collections. The process of installing controls is described in greater detail below with respect to FIGS. 9 and 10. The process is then complete at 318. The resulting GUI displays the installed control collections and controls as appropriate in the new window or tab.

Prior to or subsequent to the steps of method 300, the user can customize collections of controls available as templates, as described above with reference to FIGS. 6 and 7.

Figure 9:
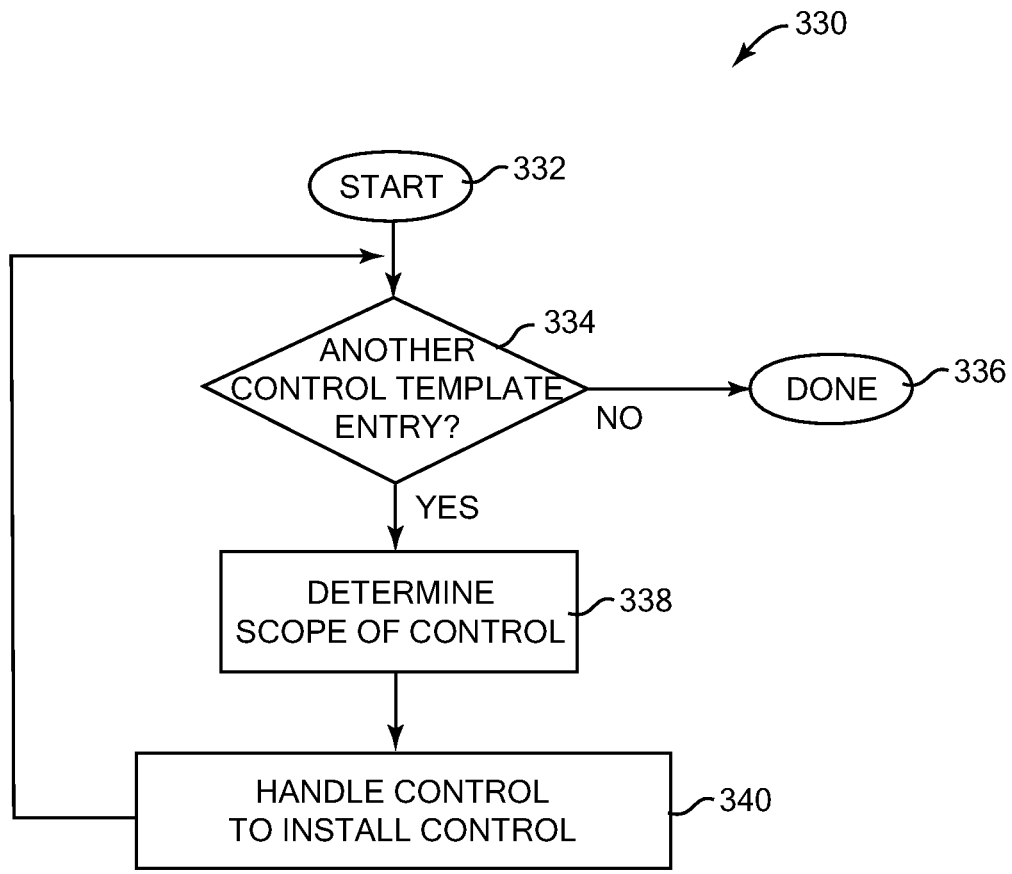
FIG. 9 is a flow diagram illustrating a method describing one embodiment for a step of FIG. 8 for installing controls in the GUI of an application program.

FIG. 9 is a flow diagram illustrating a method 330 describing one embodiment for the step 316 of FIG. 8 for installing controls in the GUI of an application program. Method 330 is an example of a more general method describing how controls can be installed in control collections (such as menus or toolbars).

Method 330 begins at step 332, and in step 334 it is checked whether there is another control template entry to install, e.g. another control in a collection template list (or other template or list) to install that is to be provided and/or displayed in the GUI. If not, all needed controls have been installed and the process continues to 336 in which the process is complete. If there is another control to install, in step 338 the scope is determined for that control by examining the scope entry or parameter in the associated control template. In next step 340, the appropriate factory methods are called to handle the control of the determined scope e.g., create or reference the control as appropriate and provide the control in appropriate control collection(s), thereby installing the control. The process of handling the control is described in greater detail below with respect to FIG. 11. The process then returns to step 334 to check for another control template entry.

Thus, in method 330 the control templates for controls to be installed are iterated over. For each control template entry, that control's declared scope is obtained and a control object of that scope is handled. Thus, scoped controls are created or referenced as necessary, where a created control has new resources created and allocated, while a referenced (shared-resource) control is referenced to existing resources already created and allocated for other existing instances of the control. References to these controls are incorporated as "children" into the collection objects which include those controls.

Figure 10:
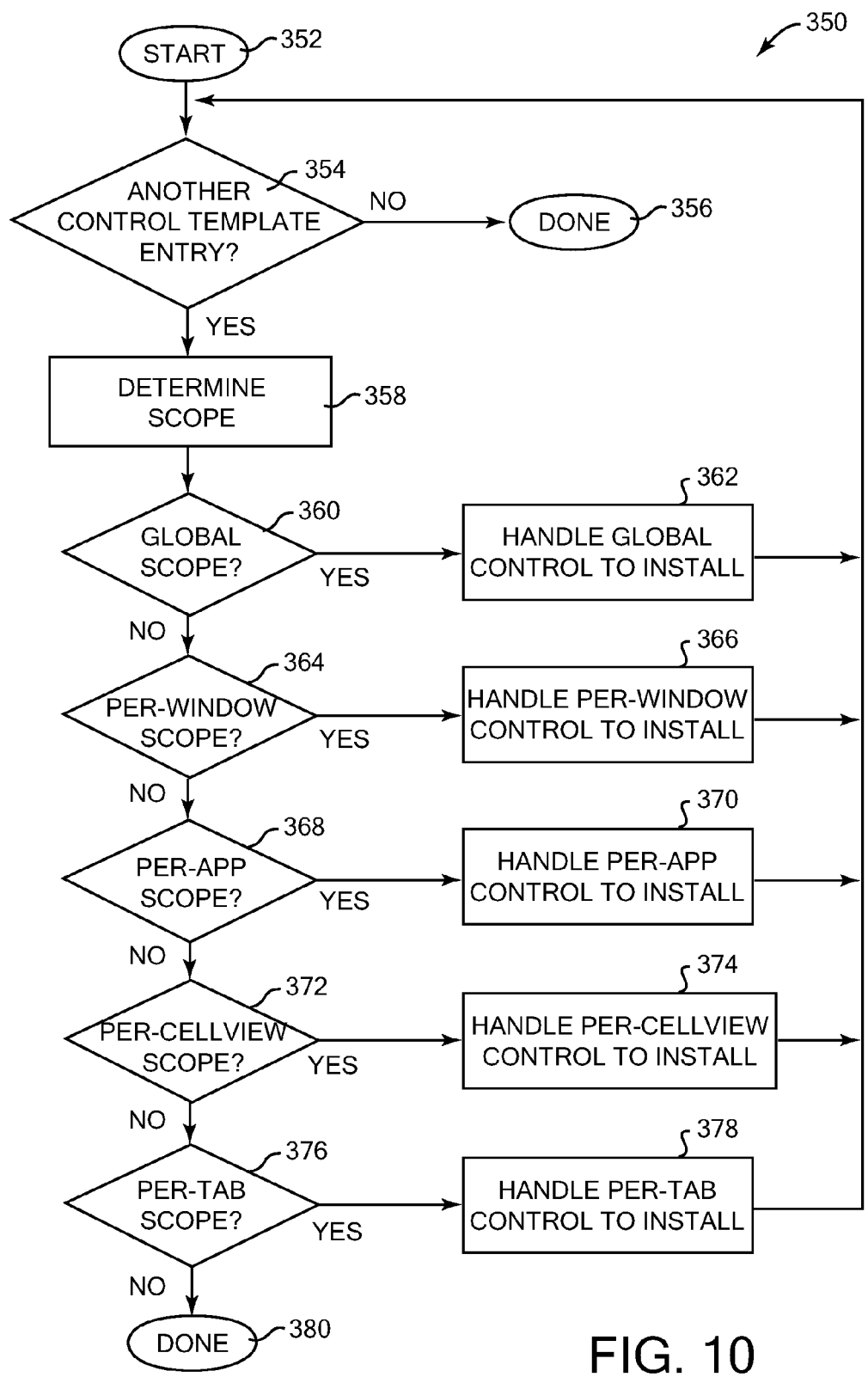
FIG. 10 is a flow diagram illustrating another example method describing the step of FIG. 8 for installing controls in the GUI of an application program.

FIG. 10 is a flow diagram illustrating another example method 350 describing the step 316 of FIG. 8 for installing controls in the GUI of an application program. Method 350 is described in a more detailed manner than the more general method 330 of FIG. 7, where the method 350 includes several specific types of control scopes. The number and types of scopes supported by the system can be different than described here, as this method is only an example.

Method 350 begins at step 352, and in step 354 it is checked whether there is another control template entry to install. If not, the process continues to step 356 in which the process is complete. If there is another control to install, in step 358 the scope is determined for that control by examining the scope entry or parameter in the associated control template. In the steps 360, 364, 368, 372, and 376, the process checks whether the determined scope is a particular scope. These checks can be made simultaneously or in any desired order, in various embodiments. The steps 362, 366, 370, 374, and 378 for handling various scope control templates are similar, and are described as a general process in greater detail below with respect to FIG. 11.

In step 360, the process checks whether the determined scope is a global scope. If so, then a global control template is handled in step 362. The process then returns to step 354 to check for another control template entry. If the scope is not a global scope, in step 364 the process checks whether the determined scope is a per-window scope. If so, then a per-window control template is handled in step 366. The process then returns to step 354 to check for another control template entry.

If the scope is not a per-window scope, in step 368 the process checks whether the determined scope is a per-application scope. For example, the scope can be for an application such as a schematic editor or a layout editor. If the scope is per-application, then a per-application control template is handled in step 370. The process then returns to step 354 to check for another control template entry. If the scope is not a per-application scope, in step 372 the process checks whether the determined scope is a per-cellview scope. For example, the scope can be for a cellview of particular schematic sub-design cell or a layout sub-design cell. If the scope is per-cellview, then a per-cellview control template is handled in step 374. The process then returns to step 354 to check for another control template entry. If the scope is not a per-cellview scope, in step 376 the process checks whether the determined scope is a per-tab scope, e.g., a control provided in a tab running within a window or program. If so, then a per-tab control template is handled in step 378. The process then returns to step 354 to check for another control template entry. If the scope is not a per-tab scope, the process is complete at 380.

Figure 11:
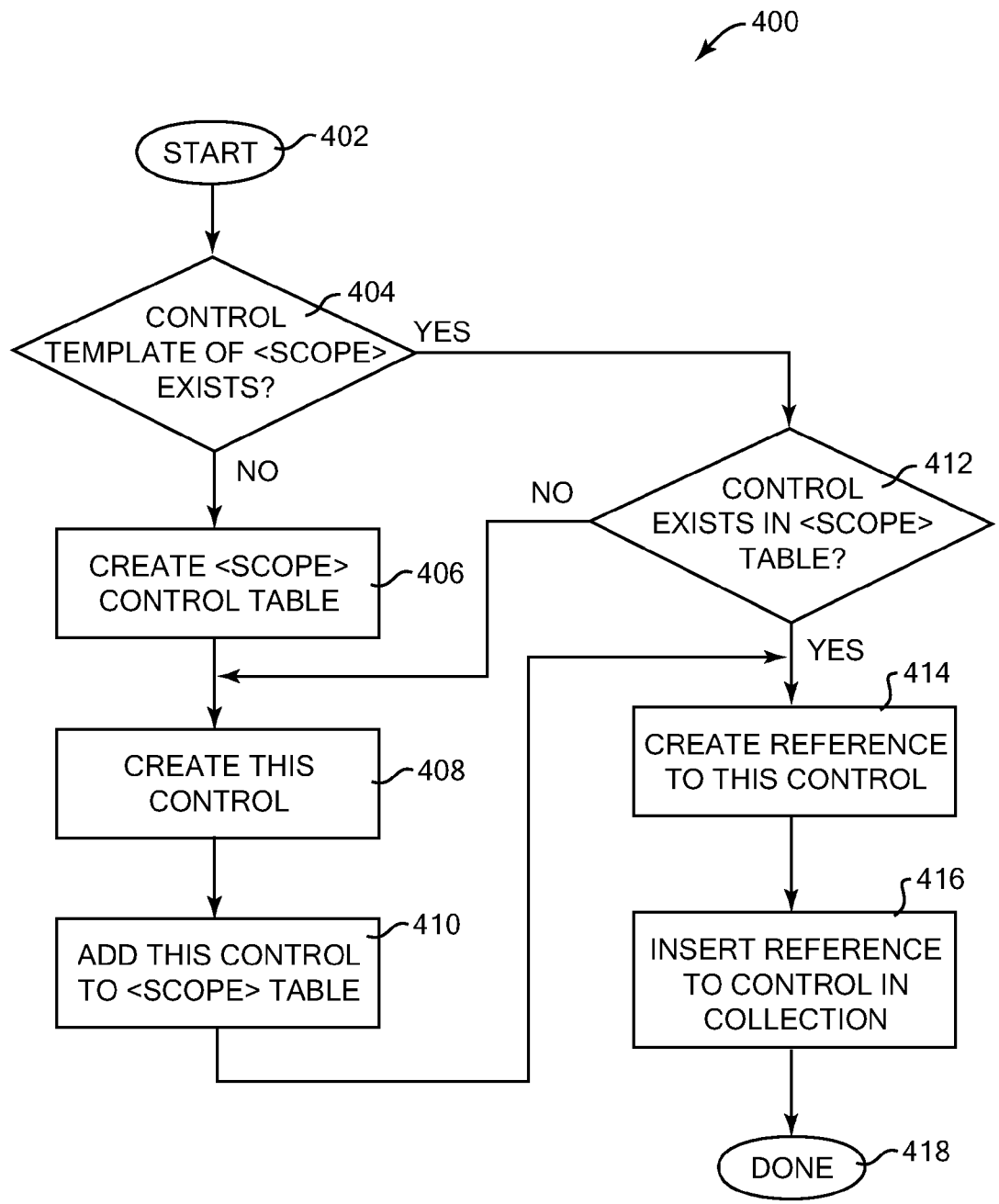
FIG. 11 is a flow diagram illustrating a method describing a step of FIG. 9 for handling control objects of a determined scope.

FIG. 11 is a flow diagram illustrating a method 400 describing the step 340 of FIG. 9 for handling control objects of a determined scope. Method 400 describes generically the process of handling a control object of any given scope, indicated by the term "<scope>" in FIG. 9, such control objects including the scoped control objects described with reference to FIG. 10, or any other scoped control objects not specifically described. For example, the method 400 can be used for any of the steps of handling control templates of specific scope in method 350 of FIG. 10, including step 362 (global scope), step 366 (per-window scope), step 370 (per-application scope), step 374 (per-cellview scope), and step 378 (per-tab scope).

The process begins in step 402, and in step 404 the process checks whether a scope master control table exists for the scoped object, e.g., whether a master control table exists for the scope of the control object. Master control tables are stored lists of control objects, each control object having an actual state or memory allocated to store that state. Each control object in the master control table has the same scope. Each application, window, tab, and cellview thus has its own scope table, and a global scope table is provided for the global scope. If no master control table exists, then in step 406 a scope master control table is created in memory and/or other storage and the full memory required to store the state is allocated. In step 408 the control object is created, and in step 410 the created control (e.g. its resources) is added to the master control table created in step 406 for that scope. The process then continues to step 414, described below.

If a master control table already exists for the scope of the control object in step 404, then the process continues to step 412 to search the master control table as to whether a control object (including its resources) already exists, e.g. whether a different instance of the control object already exists within the system. If not, the process returns to step 408 to create the scoped control object and add it to the table in step 410. If a control object does exist for the scope, then the process continues to step 414.

In step 414, regardless of the flow path to reach the step, a control object exists and is tracked in the scope table for that scope. In this step, a reference is created to that control object in the table. The reference does not require any state memory of its own. In step 416, the created reference is inserted in the appropriate collection container (menu, toolbar, etc.). The process is then complete at 418.

The above-described embodiments are example embodiments only, and other embodiments involving different interfaces, databases, files, formats and syntaxes may be created with like benefits, some examples of which are detailed in the description.

Applications outside of the field of integrated circuit design may also benefit from this invention, some examples including but not limited to printed circuit board design software (for boards and systems), and customizable and extensible scientific (complex) software. Such scientific software can deal with state-bearing components, multiple windows, multiple abstraction levels, and/or multiple tabs. For example, mechanical design software, thermal design software, and Integrated Development Environments (IDEs) for software design can be used with the present inventions.

A system according to the present inventions provides several advantages over prior systems. Advantages include offering ease of use for complex interfaces such as EDA interfaces, and providing an interface that successfully scales to the complexity of such interfaces. The present invention can provide a customization method and system that is simultaneously programmable, flexible, easy to configure, and supports multiple levels of abstraction in the data upon which the controls are operating. The invention supports multiple open "abstractions" or design view types with state-bearing components for operating on same, allows state-bearing control scope of operation to be specified on a tiered basis such as globally, per-window, per-tool/application and per-tab, which enables automatic resource sharing. The system allows state bearing controls and their operation to be programmed by a number of different programmer or user profiles, such as a central CAD group, a site-specific CAD group, a project-specific CAD group, etc. The system further allows assembly of state bearing controls into groups or collections such as toolbars and menus to be performed by a number of different personnel profiles such as central CAD group, site-specific CAD group, project-specific CAD group, project design lead, individual designer, etc. The system further supports distributed control and assembly template definitions, and can resolve identical-naming conflicts in such template definitions via a programmable search precedence.

The inventions include collections of controls that are simultaneously programmable, flexible, and easy to configure. The invention supports end-user generation of new collection templates via GUI operations, allowing customization of the collections to be made persistent across invocations of the software. Similar advantages are present for other, non-EDA applications and environments.

Although the present inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

What is claimed is:

1. A method for providing graphical controls in a graphical user interface (GUI) of a computer system, the method comprising:

receiving a command to create and display a window in the GUI on a display device, the window including one or more control instances, each control instance associated with a control, each control instance operative to perform a function of an application in response to being selected by a user;

for each of the one or more control instances:

determining an associated scope level for the control instance that indicates an extent of shared use of the control instance within the GUI, wherein the scope level is one of a plurality of different defined scope levels available to be assigned to the control instance within the GUI;

checking and determining whether another instance of the associated control already exists within the GUI and is within the scope level for the control instance, the other instance of the associated control having stored resources, wherein the checking and determining includes checking stored information associated with the scope level to determine whether the other instance of the associated control exists as being active and selectable by a user within the GUI and whether the other instance is within the scope level for the control instance, wherein the stored information includes a scope list corresponding to the scope level, the scope list operative to list all active control instances that are active within the GUI within the corresponding scope level, and wherein the scope list is one of a plurality of different stored scope lists, each scope list associated with a different scope level within the GUI;

in response to determining that the other instance of the associated control exists within the scope level for the control instance, referencing the resources of the other instance of the associated control to be shared for use with the control instance and not creating new resources for the control instance; and in response to determining that no other instance of the associated control instance exists within the scope level for the control instance, creating and storing new resources for the control instance; and causing a display of the one or more control instances in the window that is displayed in the GUI.

2. The method of claim 1 wherein each of the one or more control instances is a state-bearing control instance operative to hold and visually indicate a held state selected by a user during runtime operation of the GUI from a plurality of states offered for that control instance, each of the offered states being associated with a different one of the functions of the control instance, wherein the held state of the control instance is synchronized to a state held by the other instance, wherein the state held by the other instance is indicated in the stored resources.

3. The method of claim 1 further comprising, during runtime operation of the GUI and the application, in response to determining that a user has changed the held state of a particular one of the control instances, automatically modifying the state of each other control instance of the associated control to be synchronized with the changed held state of the particular control instance.

4. The method of claim 3 wherein the one or more control instances have been created by an end-user to extend or customize the functionality of the associated application after obtaining the application from a vendor.

5. The method of claim 1 wherein the one or more control instances are provided in a control collection displayed within the window, the control collection being one of a menu or a toolbar.

6. The method of claim 5 further comprising providing a graphical collection creation interface and allowing a user to customize the control collection to include desired control instances within the control collection, including:
   causing a display of the graphical collection creation interface; and
   receiving input from a user via the graphical collection creation interface and, based on the input, including or changing the control collection so that the control collection includes the one or more control instances.

7. The method of claim 2 further comprising:
   changing a visual appearance of the particular control instance in accordance with the changed held state; and
   maintaining the same corresponding visual appearance of the other control instance of the associated control in synchronization with the particular control instance.

8. The method of claim 1 wherein the extent of shared use within the GUI for a determined scope is based on a particular type of interface feature, wherein different scope levels assigned to different types of interface features include a plurality of the following:
   a global level scope covering any other instances of the associated control existing in applications running on the computer system;
   an application level scope covering any other instances of the associated control existing in a particular running application;
   a window level scope covering any other instances of the associated control existing in a particular existing window; and
   a tab level scope covering any other instances of the associated control existing in a particular tab of a window or an application.

9. The method of claim 1 wherein the shared use is at a global level scope covering multiple applications running on the computer system, the global level scope covering any other instances of the associated control existing in running applications of the computer system.

10. The method of claim 1 wherein the shared use is at an application level scope covering any other instances of the associated control existing in a particular running application.

11. The method of claim 1 wherein the shared use is at a window level scope covering any other instances of the associated control existing in a particular existing window.

12. The method of claim 1 wherein the shared use is at a tab level scope covering any other instances of the associated control existing in a particular tab of a window or an application.

13. The method of claim 1 wherein determining the scope includes reading a control template corresponding to the control, the control template defining the control and used to create the control instance, the control template stored on a storage device and storing the scope of the control instance.

14. The method of claim 13 further comprising reading a collection template corresponding to a control collection in the window, the control collection grouping the one or more control instances, and reading the control template for each control instance included in the collection template.

15. The method of claim 13 further comprising storing a search file that is used to restrict the checking of control templates to available templates in file locations specified in the search file, wherein the file locations include file locations of specified users and groups.

16. The method of claim 15 wherein the search file includes a search lookup order that specifies an order of file locations in which to look for control templates, wherein an earlier-listed file location in the search lookup order is used instead of a later-listed file location which stores the same control templates as the earlier-listed file location.

17. The method of claim 1 wherein the GUI is for an application environment that allows multiple different types of applications to be running, wherein the multiple different types of applications include a circuit layout application and a circuit schematic application.

18. The method of claim 1 further comprising, during initialization of software implementing the application:
   finding collection templates and control templates based on control instances and control collections used by the software, and mapping information in the collection templates and control templates to instantiated abstract factory classes, and
   wherein in response to the window being opened, creating concrete factory classes based on the abstract factory classes and corresponding to the collection templates and control templates, the concrete factory classes providing information for generating the control collections and control instances in the window.

19. A computer program product comprising a non-transitory computer readable medium including program instructions to be implemented by a computer and for providing graphical controls in a graphical user interface (GUI) of a computer system, the program instructions for:
   during initialization of software implementing an application, finding collection templates and control templates based on controls and control collections used by the software, and mapping information in the collection templates and control templates to instantiated abstract factory classes;
   receiving a command to create and display a window in the GUI on a display device, the window including one or more controls, each control operative to perform a function of the application in response to being selected by a user;
   in response to the window being displayed, creating concrete factory classes based on the abstract factory classes and corresponding to the collection templates and control templates, the concrete factory classes providing information for generating the control collections and the one or more controls in the window;
   for each of the one or more controls:
   determining an associated scope for the control that indicates an extent of shared use of the control within the GUI;
   determining whether a different instance of the control already exists within the GUI and is within the scope for the control, the different instance of the control having stored resources;
   in response to determining that the different instance of the control exists within the scope for the control, referencing the resources of the different instance of the control to be shared for use with the control; and
   in response to determining that no different instance of the control exists within the scope for the control, creating and storing new resources for the control; and causing a display of the one or more controls in the window that is displayed in the GUI.

20. The computer program product of claim 19 wherein each of the one or more controls is a state-bearing control operative to hold a state of a plurality of available states, wherein the state of the control is synchronized to a state provided in the stored resources.

21. The computer program product of claim 20 further comprising, during operation of the application, automatically managing the state of each control to be synchronized with a state of any different instances of the control.

22. The computer program product of claim 19 wherein the controls are provided in a control collection displayed within the window, the control collection being one of a menu or a toolbar.

23. The computer program product of claim 22 further comprising providing a graphical collection creation interface and allowing a user to customize the control collection to include desired controls within the control collection, including:
  causing a display of the graphical collection creation interface; and
  receiving input from a user via the graphical collection creation interface and, based on the input, including or changing the control collection so that the control collection includes the one or more controls.

24. The computer program product of claim 19 wherein the extent of shared use within the GUI for a determined scope is based on a particular type of interface feature, wherein the scope of shared use is at least one of:
  a global level scope covering multiple applications running on the computer system, the global level scope covering any different instances of the control existing in running application of the computer system;
  an application level scope covering any different instances of the control in a particular running application;
  a window level scope covering any different instances of the control existing in a particular existing window; and
  a tab level scope covering any different instances of the control existing in a particular tab of a window or an application.

25. The computer program product of claim 19 wherein determining the scope includes reading a control template corresponding to the control, the control template stored on a storage device and storing the scope of the control, and further comprising: reading a collection template corresponding to a control collection in the window, the control collection grouping the one or more controls, and reading the control template for each control included in the collection template.

26. The computer program product of claim 25 further comprising storing a search file that is used to restrict the checking of control templates and collection templates to available templates in file locations specified in the search file, wherein the file locations include file locations of specified users and groups, and wherein the search file includes a search lookup order that specifies an order of file locations in which to look for control templates and collection templates, wherein an earlier-listed file location in the search lookup order is used instead of a later-listed file location which stores the same control templates or collection templates as the earlier-listed file location.

27. A computer system for providing graphical controls in a graphical user interface (GUI) of the computer system, the system comprising:
  one or more storage devices; and
  at least one processor in communication with the storage devices, the processor receiving a command to create and display a window in the GUI on a display device, the window including one or more controls, each control operative to perform a function of an application in response to being selected by a user,
  wherein the at least one processor stores at least one search file;
  wherein for each of the one or more controls, the at least one processor:
  determines an associated scope for the control that indicates an extent of shared use of the control within the GUI, wherein determining the scope includes checking a control template corresponding to the control from a plurality of available control templates, the control template stored on a storage device and storing the associated scope for the control,
  wherein the at least one search file is used to restrict checking of available control templates to available control templates in file locations specified in the search file, wherein the file locations include file locations of specified users and groups,
  determines whether a different instance of the control already exists within the GUI and is within the scope for the control, the different instance of the control having stored resources on the one or more storage devices,
  in response to determining that the different instance of the control exists within the scope for the control, references the resources of the different instance of the control to be shared for use with the control, and
  in response to determining that no different instance of the control exists within the scope for the control, creates and stores new resources for the control on the one or more storage devices, and
  wherein the processor causes a display of the one or more controls in the window that is displayed in the GUI on the display device.

28. The system of claim 27 wherein each of the one or more controls is a state-bearing control operative to hold a state of a plurality of available states, wherein the at least one processor synchronizes the state of the control to a state provided in the stored resources.

29. The system of claim 27 wherein the controls are provided in a control collection displayed within the window, the control collection being one of a menu or a toolbar.

30. The system of claim 29 wherein the at least one processor further provides a graphical collection creation interface and allows a user to customize the control collection to include desired controls within the control collection, including:
  causing a display of the graphical collection creation interface; and
  receiving input from a user via the graphical collection creation interface and, based on the input, including or changing the control collection so that the control collection includes the one or more controls.

31. The system of claim 27 wherein the at least one processor reads a collection template corresponding to a control collection in the window, the control collection grouping the one or more controls, and checks the plurality of control templates for a corresponding control template for each control included in the collection template.

32. The system of claim 31 wherein the at least one search file is used to restrict the checking of control templates and collection templates to available templates in the file locations specified in the search file.

33. The system of claim 27 wherein the GUI is for an application environment that allows multiple different types of applications to be running, wherein the multiple different types of applications include a circuit layout application and a circuit schematic application.

34. The method of claim 1 further comprising, for each of the one or more control instances:
reading a control template corresponding to the control, the control template stored on a storage device and storing the definition of the control instance, wherein the control template is used to create the control instance, and wherein one or more control templates used to create the one or more controls are restricted to storage locations associated with specified users and groups.

* * * * *